(12) United States Patent
Morooka

(10) Patent No.: US 8,954,843 B2
(45) Date of Patent: Feb. 10, 2015

(54) LAYOUT APPARATUS, LAYOUT METHOD, AND LAYOUT PROGRAM

(75) Inventor: Hidekazu Morooka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1256 days.

(21) Appl. No.: 12/699,641

(22) Filed: Feb. 3, 2010

(65) Prior Publication Data

US 2010/0199173 A1 Aug. 5, 2010

(30) Foreign Application Priority Data

Feb. 4, 2009 (JP) ................................ 2009-024148

(51) Int. Cl.
*G06F 3/12* (2006.01)
*G06F 17/21* (2006.01)

(52) U.S. Cl.
CPC ............ *G06F 3/1208* (2013.01); *G06F 3/1243* (2013.01); *G06F 3/1252* (2013.01); *G06F 17/212* (2013.01)
USPC ............ 715/246; 715/243; 715/247; 715/251

(58) Field of Classification Search
CPC .............................. G06F 17/212; G06F 17/217
USPC ................................................. 715/246, 273
See application file for complete search history.

(56) References Cited

U.S. PATENT DOCUMENTS

| | | | | |
|---|---|---|---|---|
| 5,579,117 | A * | 11/1996 | Arsenault et al. | 358/296 |
| 6,144,974 | A * | 11/2000 | Gartland | 715/205 |
| 6,546,151 | B1 * | 4/2003 | Araki et al. | 382/282 |
| 6,746,051 | B1 * | 6/2004 | Archie et al. | 283/56 |
| 8,380,005 | B1 * | 2/2013 | Jonsson | 382/282 |
| 2001/0024291 | A1 * | 9/2001 | Mori et al. | 358/1.12 |
| 2004/0234303 | A1 * | 11/2004 | Shimizubata | 399/306 |
| 2005/0155267 | A1 * | 7/2005 | Hamilton | 40/734 |
| 2005/0172221 | A1 * | 8/2005 | Kobashi et al. | 715/513 |
| 2008/0199235 | A1 * | 8/2008 | Shoji et al. | 399/364 |
| 2008/0231871 | A1 * | 9/2008 | Nelson et al. | 358/1.5 |
| 2008/0316534 | A1 * | 12/2008 | McGarry et al. | 358/1.18 |
| 2010/0102108 | A1 * | 4/2010 | Dyer | 229/92.8 |

FOREIGN PATENT DOCUMENTS

| | | |
|---|---|---|
| JP | 2004-336539A A | 11/2004 |
| JP | 2005-216182 | 8/2005 |
| JP | 2008-188874A A | 8/2008 |

* cited by examiner

*Primary Examiner* — Stephen Hong
*Assistant Examiner* — Ahamed I Nazar
(74) *Attorney, Agent, or Firm* — Canon USA Inc IP Division

(57) ABSTRACT

A layout apparatus for performing layout by arranging a plurality of layout frames on regions respectively corresponding to both of front and back surfaces of a sheet includes an association processing portion configured to set separation information for separating the plurality of layout frames, a setting unit configured to set, based on the separation information, a separation position on at least one of the regions respectively corresponding to the front and back surfaces of the sheet such that the region corresponding to the set separation position is separated at the set separation position into areas on each of which the layout frames to be separated do not coexist, and a layout processing portion configured to correct at least one of the separation position, a size of each layout frame, and a position of each layout frame so that the layout frames do not overlap with one another at the separation position set on the front/back surfaces of the sheet, and that the layout frames to be separated do not coexist in each of the areas into which the region is separated at the separation position, on the front/back surfaces.

23 Claims, 26 Drawing Sheets

Image on Back Surface after Application of Processing

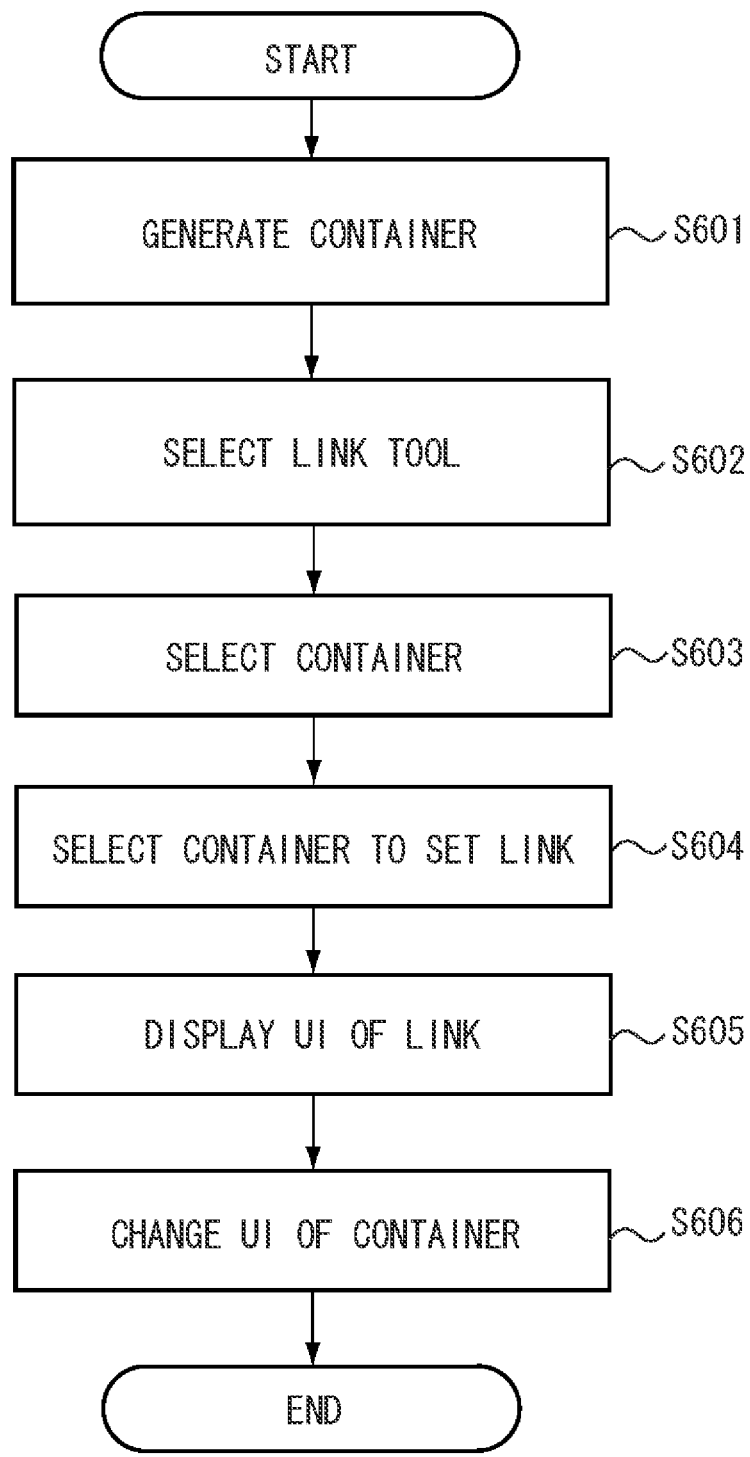

FIG. 21

```
XXXX, Nakahara-ward, Kawasaki-city,
Kanagawa-prefecture
OO Service, Inc.
              Dear Mr. Taro Suzuki
```

```
Announcement OF New Product
Information!
Electronic Dictionary XXX Nicknamed
"Mr. Recognition"
Recognizing Characters with Scanner
Due for Release in November
Retail Price: ¥25,000
Rollout Meeting of New Product
Held at XXX.
```

```
Coupon for Gold Members
10% of Price of Digital Camera Off
Expiration Date: December 1, 2008
```

```
Coupon for Gold Members
15% of Price of Camera Lens Off
Expiration Date: January 31, 2009
```

FRONT SURFACE

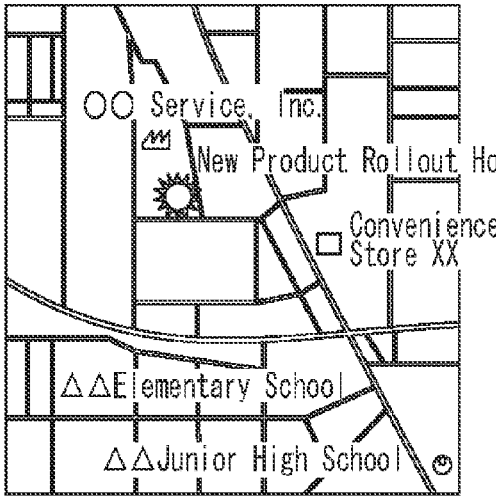

BACK SURFACE

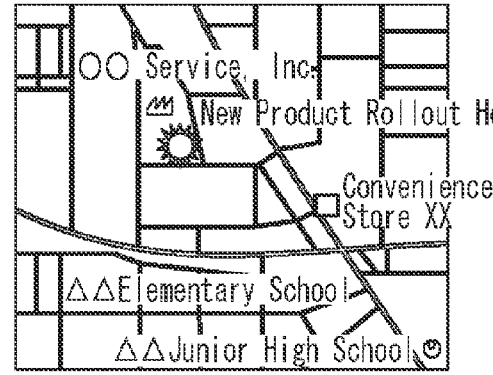

Image on Back Surface after
Application of Processing

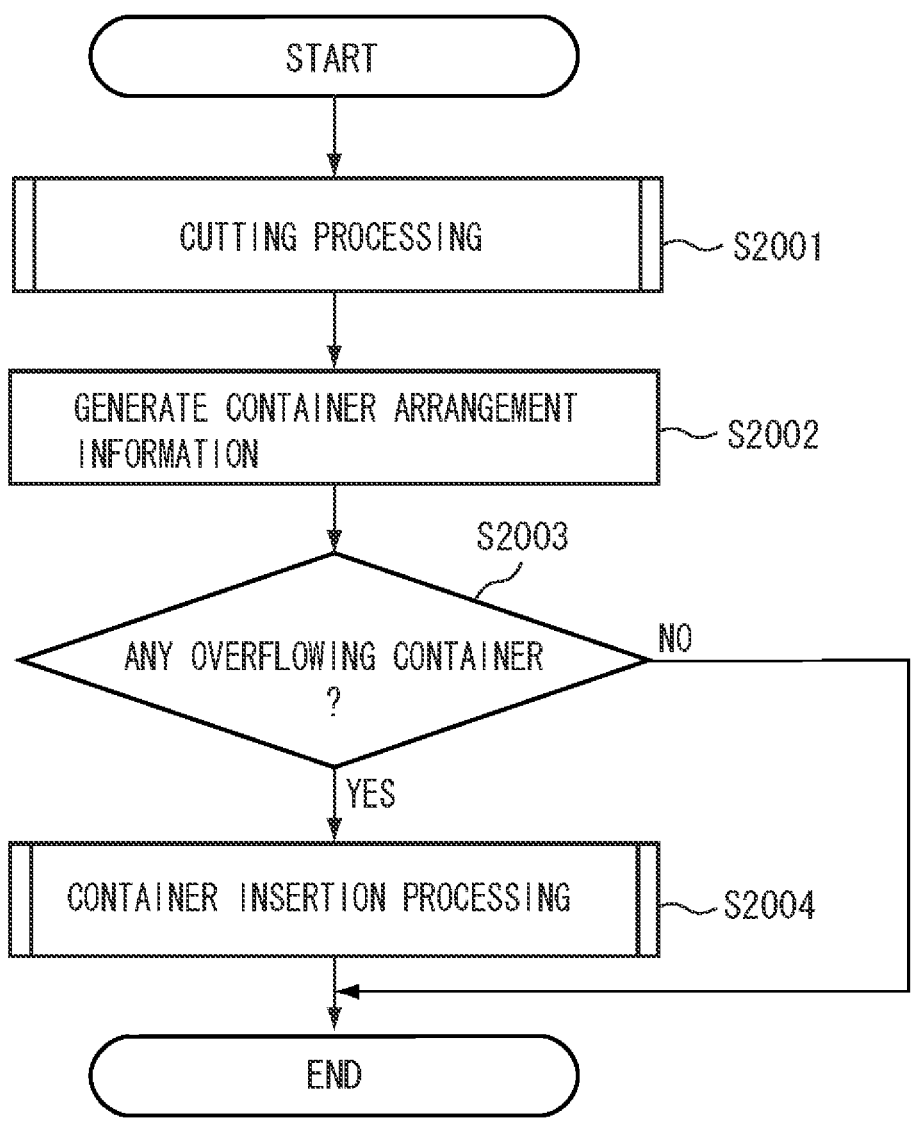

FIG. 23
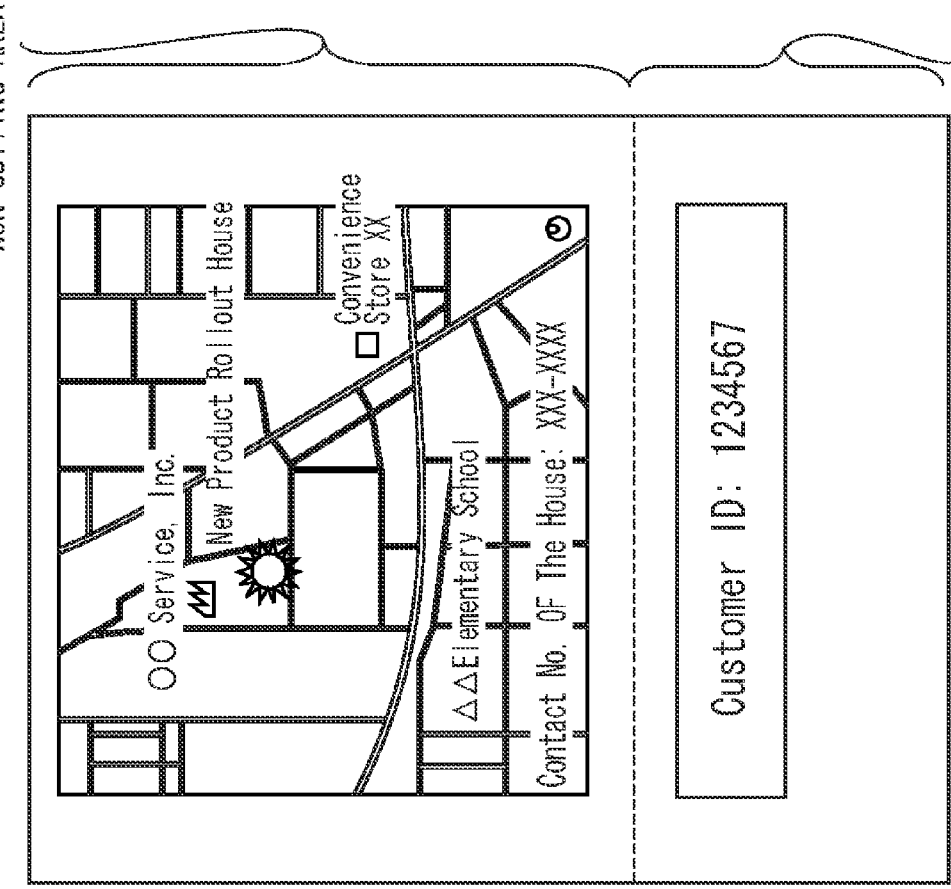
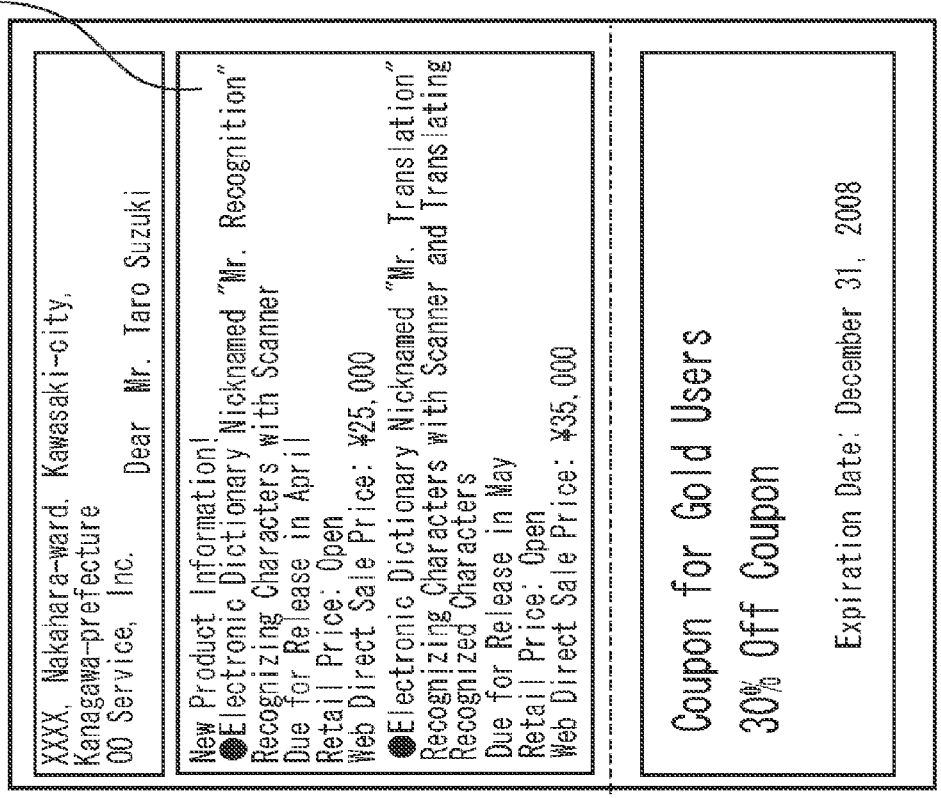

FIG. 24

EXAMPLE OF CONTAINER ARRANGEMENT INFORMATION

| AREA INFORMATION | FRONT SURFACE | BACK SURFACE |
|---|---|---|
| NON-CUTTING | PRESENT | ABSENT |
| CUTTING | ABSENT | ABSENT |

FIG. 26
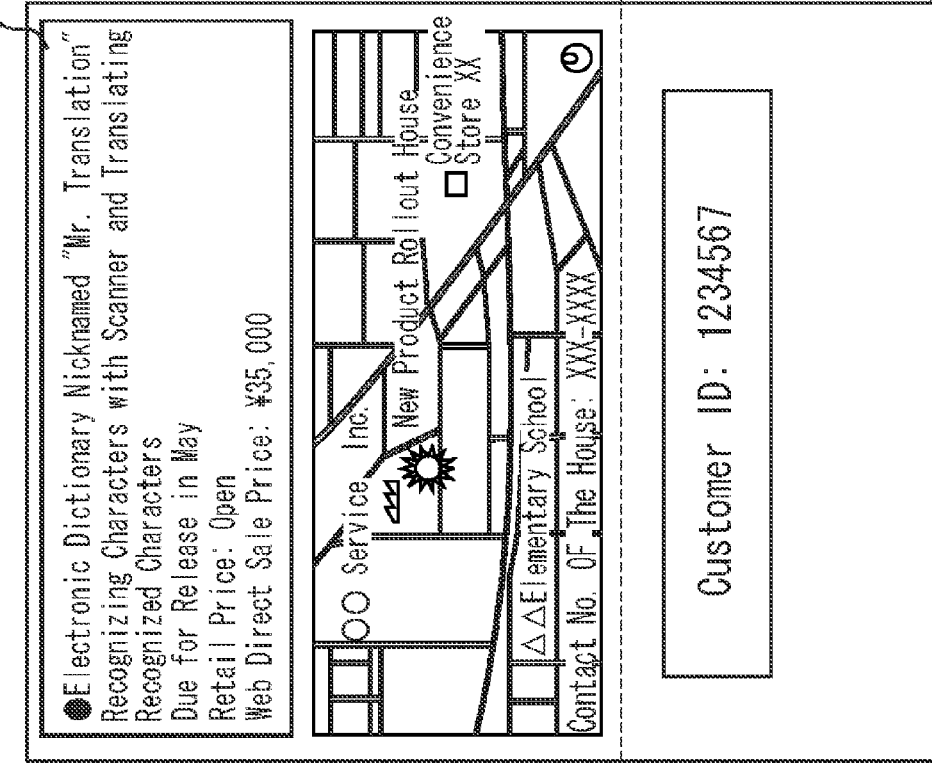
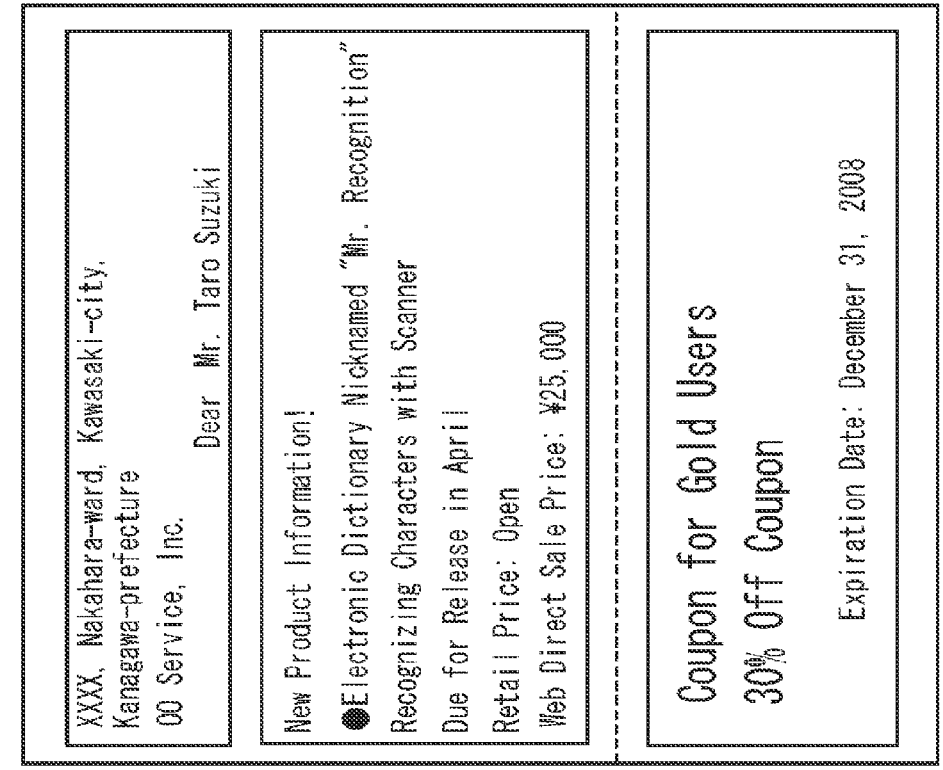

LAYOUT APPARATUS, LAYOUT METHOD, AND LAYOUT PROGRAM

BACKGROUND OF THE INVENTION

1. Field of the Invention

The present invention relates to a layout apparatus, method, and program which lay out, when contents including a cutting line are printed, the contents in an optimal area.

2. Description of the Related Art

Recently, variable printing for outputting print products that meet customer needs has been performed. A variable printing technique is applied to a technique of printing coupons, whose contents vary with customers, and cutting lines on direct mails. The printing of the cutting lines is featured in that parts of a print product are cut off at cutting positions. Thus, the cutting positions need setting after a layout of the back surface of the print product is adjusted. However, layout processing in consideration of the layout of the back surface has not been performed. Consequently, users have no choice but to lay out print products provided with cutting lines by trial and error. This is inconvenient. In order to eliminate this inconvenience, users have no choice but to adjust layouts of such print products by trial and error and to adjust cutting positions on the front surface of each of the print products and those on the back surface thereof to one another. Accordingly, usability is low.

In order to solve such a problem, for example, Japanese Patent Application Laid-Open No. 2005-216182 discusses a technique of sorting record data to be flowed into each layout frame (referred to also as each container) based on a key added to the record data.

However, in a case where two-sided printing is performed on a print product, even when the above sorting technique is applied thereto, a difference can be generated between a cutting position on the front surface thereof and that on the back surface thereof due to a difference in data size between data flowed into a container on the front surface thereof and data flowed into a container on the back surface thereof. When a cutting line is printed, it is necessary in consideration of occurrence of separation of contents to perform layout overflow processing to deal with the separation of contents. However, when layout overflow processing is performed, many contents are concentrated on the same surface by performing layout processing. Thus, contents should be laid out by relatively reducing the size of characters. Accordingly, a problem occurs in which the characters are illegible.

BRIEF SUMMARY OF THE INVENTION

According to an aspect of the present invention, a layout apparatus for performing layout by arranging a plurality of layout frames on regions respectively corresponding to both of front and back surfaces of a sheet includes a separation information setting unit configured to set separation information for separating the plurality of layout frames, a separation position setting unit configured to set, based on the separation information set by the separation information setting unit, a separation position on at least one of the regions respectively corresponding to the front and back surfaces of the sheet such that the region corresponding to the set separation position is separated at the set separation position into areas on each of which the layout frames to be separated do not coexist, and a correction unit configured to correct at least one of the separation position, a size of each layout frame, and a position of each layout frame so that the layout frames do not overlap with one another at the separation position set by the separation position setting unit on the front and the back surfaces of the sheet, and that the layout frames to be separated do not coexist in each of the areas into which the region is separated at the separation position, on the front and the back surfaces.

According to an exemplary embodiment of the present invention, when contents including a cutting line are printed, positions of contents printed on both surfaces of a sheet are appropriately located. Consequently, the contents can be prevented from being unnaturally separated when the sheet is cut along the cutting line.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a flowchart illustrating a procedure for setting a link corresponding to containers according to the exemplary embodiment of the present invention.

FIG. 21 is a view illustrating an example of the cutting position addition processing according to the second exemplary embodiment of the present invention.

FIG. 22 is a flowchart illustrating a procedure for performing cutting processing according to a third exemplary embodiment of the present invention.

FIG. 23 is a view illustrating an example of a case where there is an overflow place in a non-cutting area on a surface of a sheet.

FIG. 24 is a table illustrating an example of container arrangement information generated on the basis of the example of the case illustrated in FIG. 23.

FIG. 26 is a view illustrating an example of flowing contents into an inserted container.

DESCRIPTION OF THE EMBODIMENTS

Various exemplary embodiments, features, and aspects of the invention will be described in detail below with reference to the drawings.

First, as an introductory description of an exemplary embodiment of the present invention, fundamental processing to be performed by a layout apparatus according to an exemplary embodiment of the present invention is described hereinafter.

Figure 1:
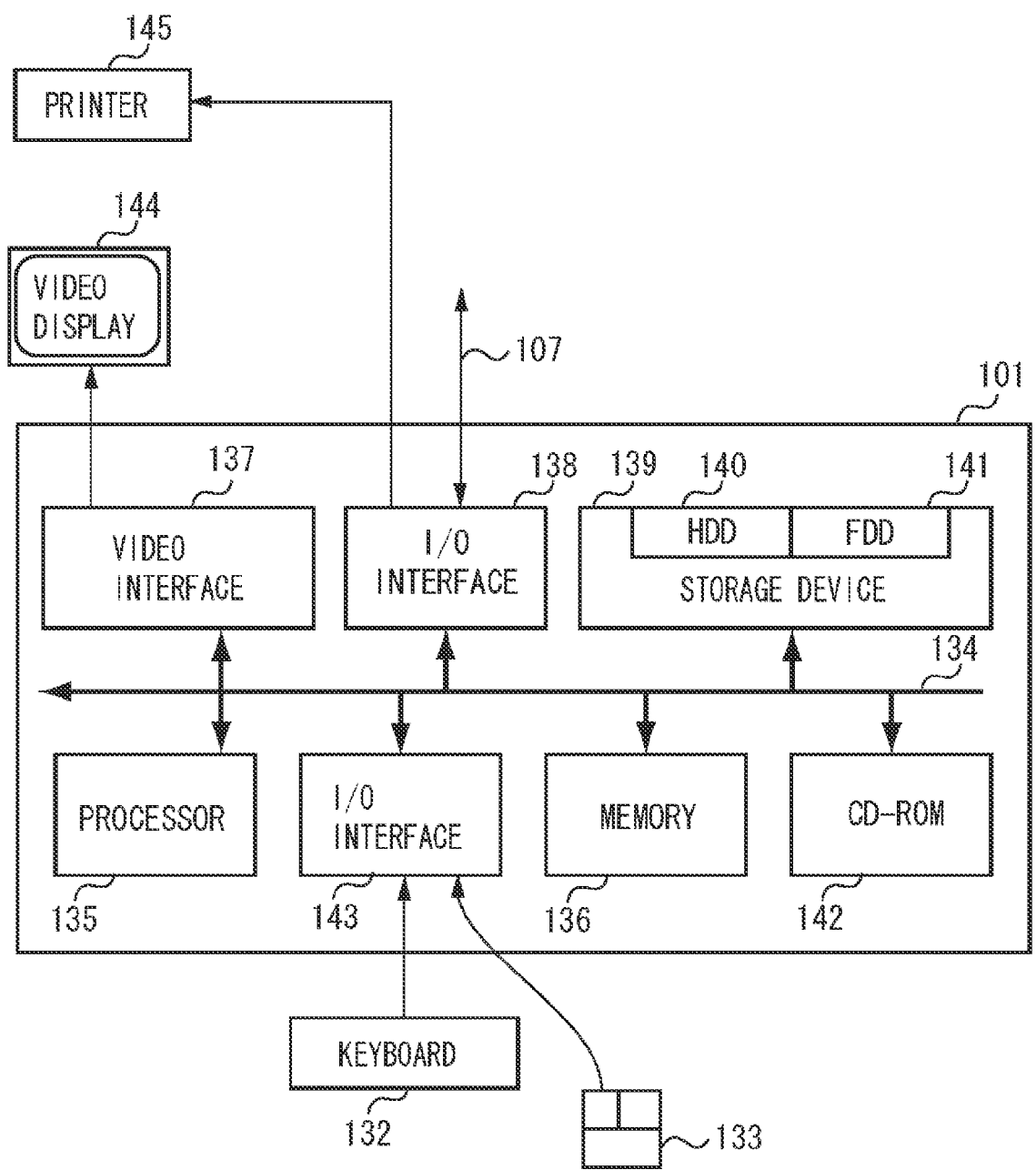
FIG. 1 is a block view illustrating a hardware configuration of a layout apparatus according to an exemplary embodiment of the present invention.

FIG. 1 is a block view illustrating a hardware configuration of a layout apparatus according to an exemplary embodiment of the present invention. As illustrated in FIG. 1, input devices such as a keyboard 132 and a mouse 133 serving as a pointing device are connected to a host computer 101 via an input/output (I/O) interface 143. A video display device 144 serving as an output device is connected to a host computer 101 via a video interface 137. Output devices including a printer 145 can also be connected to the host computer 101 via an I/O interface 138. The I/O interface 138 also has a function of connecting the host computer 101 to a network 107. Thus, the I/O interface 138 can connect the host computer 101 via the network 107 to another computer apparatus. Typical examples of the network 107 are a local area network (LAN) and a wide area network (WAN).

The host computer 101 includes at least one processor (central processing unit (CPU)) 135, and a memory unit 136 formed of a semiconductor memory such as a random access memory (RAM) and/or a read-only memory (ROM). A storage device 139 includes a hard disk drive (HDD) 140 capable of exchanging data with a computer-readable medium which stores various data such as a program, and a floppy disk drive (FDD) 141. Although not illustrated in FIG. 1, various storage devices such as a magnetic tape drive also can be used as the storage device 139. A compact disk read-only memory (CD-ROM) drive 142 is provided as a nonvolatile data source.

The host computer 101 utilizes components that communicate with one another via an interconnection bus 134 according to an operating system such as LINUX (registered trademark) or Microsoft Windows (registered trademark). That is, the components are connected via the interconnection bus 134 so as to be able to communicate with one other, and are utilized by an operating system installed in the host computer 101.

Software for implementing a layout method according to an exemplary embodiment of the present invention is stored in a computer-readable medium including, e.g., the above storage device 139. The software is loaded from the computer-readable medium into the host computer 101 and executed by the CPU 135 of the host computer 101. Thus, the CPU 135 reads and executes the software to implement flowcharts which will be described below.

Figure 2:
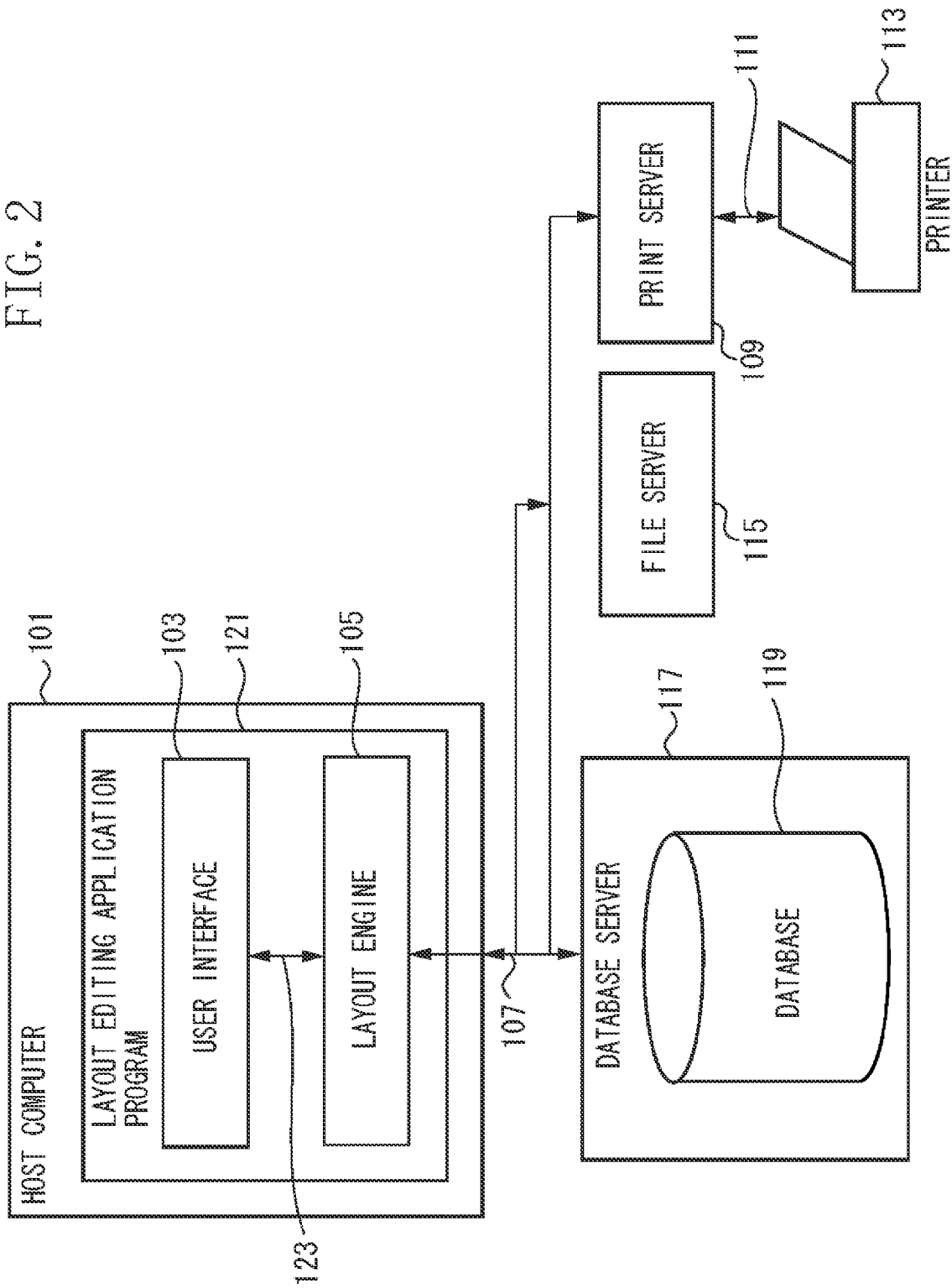
FIG. 2 is a schematic block view illustrating a configuration of a printing system including the layout apparatus according to the exemplary embodiment of the present invention.

FIG. 2 is a schematic view illustrating a configuration of a printing system including the layout apparatus according to the exemplary embodiment of the present invention. In the printing system illustrated in FIG. 2, the processor 135 illustrated in FIG. 1 executes a layout editing application program 121 which will be described below. Thus, various printing processes are performed.

The layout editing application program (hereinafter referred to also as the layout program) 121 is typically resident in the hard disk drive 140 and executed by the processor 135. The layout editing application program 121 is encoded on a CD-ROM or a floppy disk and read and provided to a user through the associated CD-ROM drive 142 or the associated floppy disk drive 141. Alternatively, the layout editing application program 121 can be read from a network connection 107.

The layout editing application program 121 instructs to perform variable data printing (VDP), and includes two software components. One of the software components is a layout engine 105, which calculates the positions of rectangles and lines based on constraints and sizes given in rectangular ranges. The other software component is a user interface (UI) 103, which allows a user to generate a document template and which provides a mechanism that associates a layout frame with the data source in the document template.

The UI 103 and the layout engine 105 communicate with each other via a communication channel 123. Generally, a data source for generating a document is a typical database 119 on a database server 117 constituted by another computer that runs a database application program. The host computer 101 communicates with the database server 117 via the network connection 107.

The layout editing application program 121 generates a document template to be stored in a file server 115 constituted by another computer. The layout editing application program 121 also generates a document constituted by a document template merged with data. The document is stored in a local file system of the host computer 101 or in the file server 115, or directly printed by a printer 113.

A print server 109 is a computer which provides a network function to a printer that is not connected directly to the network. The print server 109 and the printer 113 are connected to each other via a typical communication channel 111.

Figure 3:
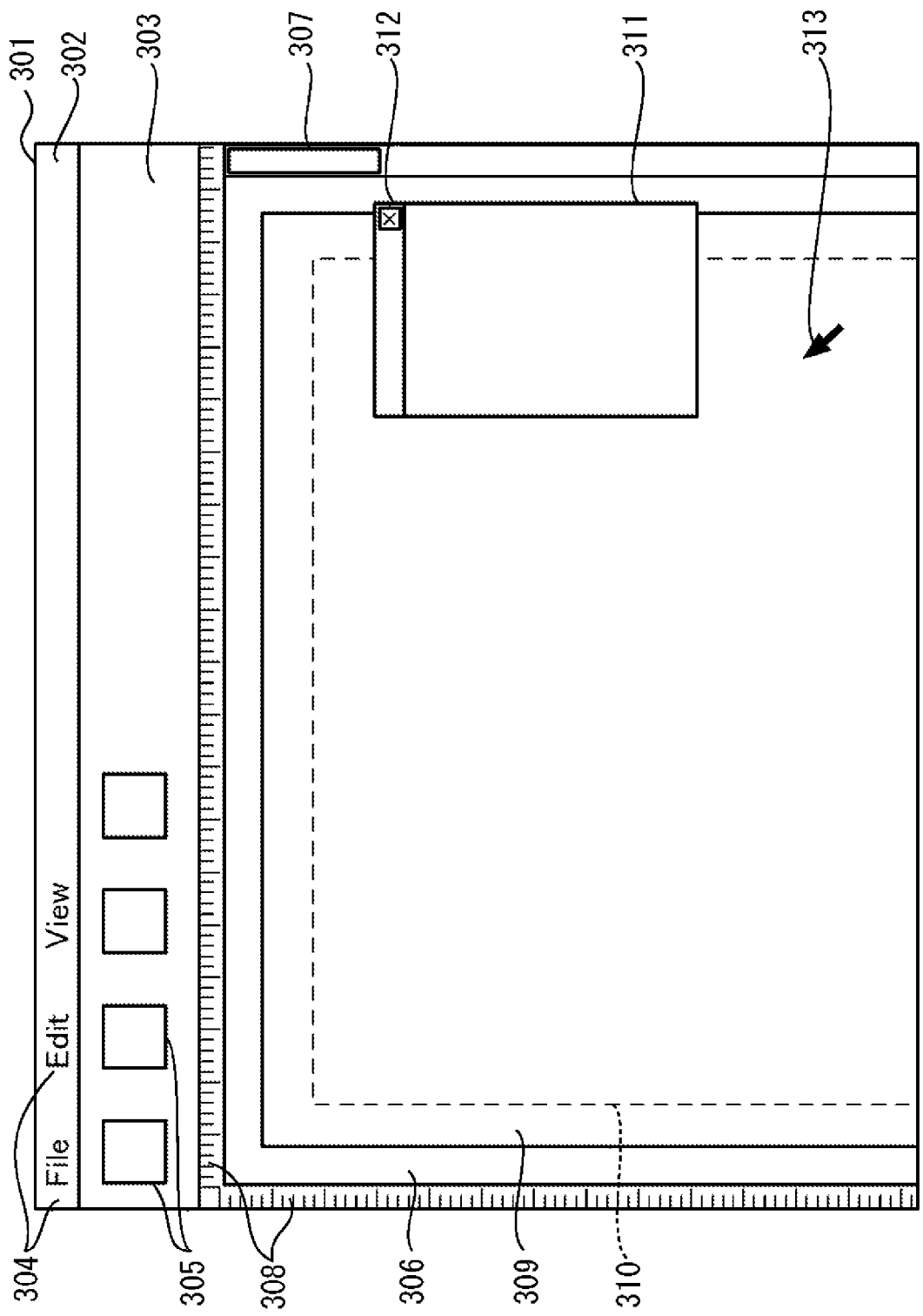
FIG. 3 is a view illustrating an example of a window according to the exemplary embodiment of the present invention displayed during layout processing.
Figure 4:
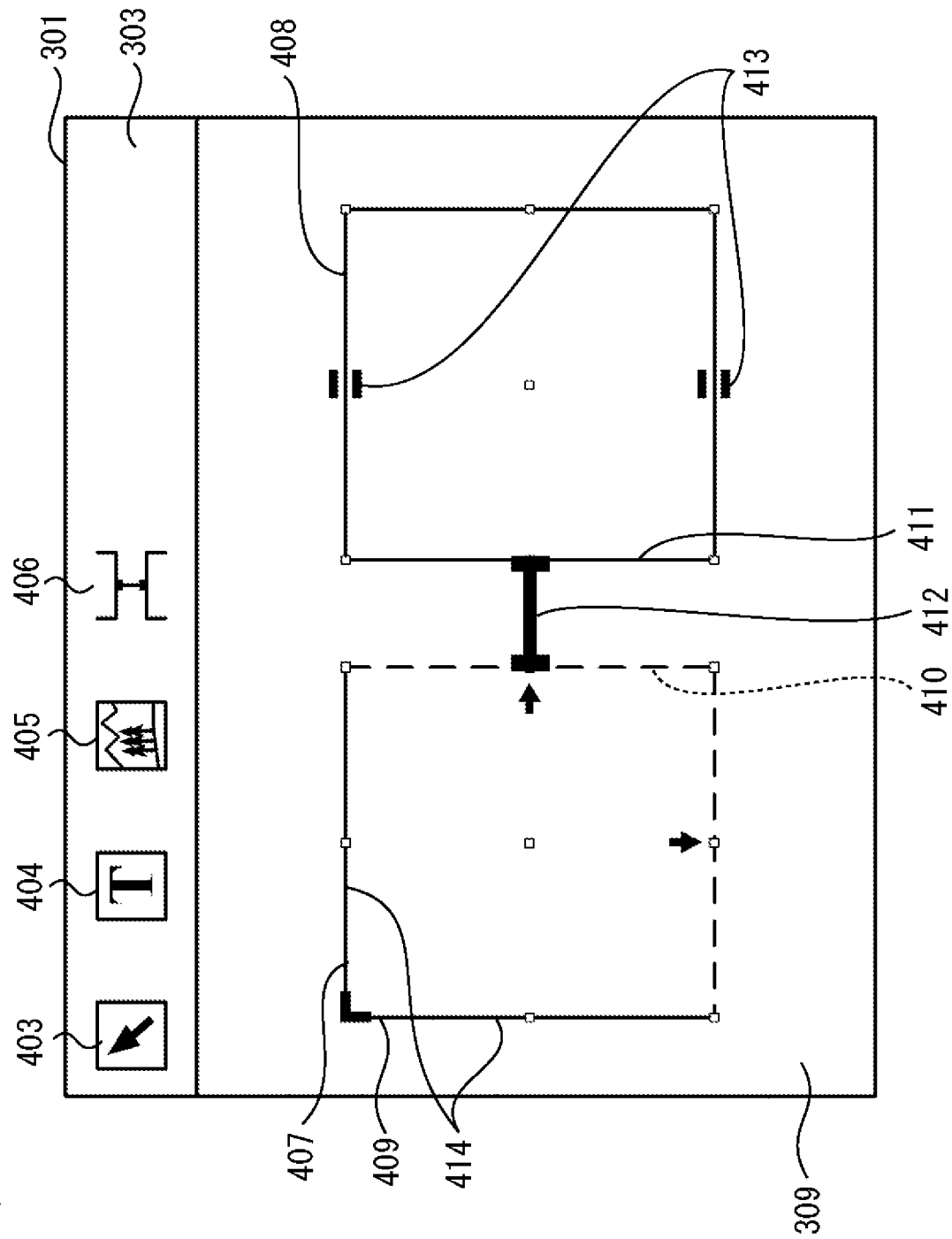
FIG. 4 is a view illustrating another example of a window according to the exemplary embodiment of the present invention displayed during layout processing.

FIGS. 3 and 4 respectively illustrate examples of a window displayed during layout processing performed in the layout apparatus according to the exemplary embodiment of the present invention.

An application window 301 illustrated in FIG. 3 is displayed on the video display device 144 during an operation. The UI 103 includes a user interface constituted by the application window 301. The application window 301 includes a menu bar 302 and a tool bar 303, which are capable of moving to various positions on a screen of the video display device 144. In addition, the application window 301 includes a work area 306 which can move according to a position and an operation of the mouse 133, optional rulers 308, an optional palette 311, and a cursor/pointer device 313. The application window 301 can be set in a non-display state.

The menu bar 302 has a number of menu items 304 extended under a layer of menu options. The tool bar 303 has a number of tool buttons and widgets 305 which can be set in a non-display state or display state in a special mode of the application program. The optional rulers 308 are used to indicate the position of a pointer, a page, a line, a margin guide, a layout frame (e.g., a container), or an object in the work area 306. The palette 311 is used to access an additional function such as a variable data library. The palette 311 has a window control 312 for moving, resizing, or closing the palette 311. The layout frame (e.g., a container) is defined as a partial region into which contents are flowed.

The work area 306 is used to display and edit the design of the document template. This enables a user to grasp an outline of a document printed for preparation and to understand how a document obtained by merging are changed on the basis of an amount or a size of variable data. When an external data source is linked to the template, a variable text or image is displayed in each container so that a preview of a current document can be implemented.

The work area 306 includes a scroll bar 307, the optional rulers 308, and a document template 309. The document template 309 can indicate the presence of a plurality of pages. The page size of a given document template is designated by the user by a known technique. A page size of a given document template is designated by a user. The actual number of pages of each document changes depending on variable data. For example, when variable data cannot be fit into one page, an additional page is automatically generated. A border in each page is a given page margin 310 representing the maximum width of an object printable thereon.

As illustrated in FIG. 4, the tool bar area 303 has user selectable "buttons". A selection tool button 403 is used to select, move, change a size of, resize, lock and unlock the sides of a container. A plurality of containers are selected by performing a predetermined operation while selecting a plurality of containers. An image container tool button 405 is used to generate a container to which a fixed image or a variable image is assigned. A text container tool button 404 is used to generate a container to which a fixed text or a variable text is assigned. A link tool button 406 is used to create a link required to control the distance between the containers. These buttons are implemented as tool tips of icons which change depending on an operation state.

As illustrated in FIG. 4, each object can be displayed on the document template 309 of one page. Each object has a large number of containers 407 and 408, an anchor icon 409 to be optionally applied, non-fixed sides 410, a link 412, and sliders 413.

A container is a space having a fixed or variable text or a fixed or variable image in a document template, and is laid out together with another container and an object. The container can be moved, resized, and re-generated using the pointing device 313 by operating the mouse 133 on the user interface. More exactly, the container has a set of settings, a visual expression, an interaction, and an editing operation. The container is defined in the following conditions (1) through (4).

(1) A fixed or variable content is assigned to a container.
(2) The container has options for a decorative function concerning text settings, such as a background color, a border, a font-style, and the like to be applied to a content.
(3) The container is merged with data from a data source. The representation of the container can be subjected to, e.g., printing, or displaying on the screen 144, and both of printing and displaying thereon.
(4) The container has a user interface. The UI 103 displays options for the decorative function of the container, such as a choice of background colors and fonts, and is used to add a function required to permit editing or display of settings of the container. A special UI function element includes, for example, a corner icon, which is used to interactively change and display a border or the size and the position of the container.

Constraints are imposed on each container. An example of the constraint is "the maximum height of the content in this container is 4 inches". Another example of the constraint is "the left edge of the content in the container must be displayed at the same horizontal position in each document". Various methods for displaying and editing the constraints using a graphic user interface (GUI) according to the present invention will be described hereinafter.

A content placeholder for designating the layout of a fixed content is known in the field of digital printing techniques. In the following discussion, it is assumed that a container has a position and a size which are edited and displayed by a known technique. On the other hand, in the following description, the present invention is focused on display and editing by a method specialized in variable data printing.

The container enables a user to designate the sizes and the positions of the contents of a document by designating the positions, sizes, and constraints of containers. Because a plurality of document are generated from one document template, the user interface should be used to designate and display a large number of possible settings and constraints of containers. The sides of one container define the virtual borders of an associated content, which are displayed in a document. According to the present invention, for example, a discussion about the left side of a container is that about the leftmost side of layout of the associated content, which can be displayed even in any documents. Similarly, a discussion about the height of a container is that about a constraint of the height of an associated content in a document generated. In the present specification, this distinction will become apparent by describing a side or a size of a container with reference to the user interface 103.

Hereinafter, the term "fixed" which defines a certain number of values used to constrain display of contents is explained in each situation.

(a) When the width of a container is fixed, a width assigned to associated contents is equal in all documents.
(b) When the height of a container is fixed, a height assigned to associated contents is equal in all documents.
(c) When a constraint of a distance is fixed, a designated distance serves as a constraint imposed to all documents.
(d) When the right and the left sides of a container are fixed, the horizontal positions of the sides of a page are unchanged in all documents. However, the height or the vertical position of a container may change.

(e) When the top and the bottom sides of a container are fixed, the vertical positions of the sides of a page are unchanged in all documents. However, the width or the horizontal position of a container may change in each document.

(f) The vertical axis of a container is a virtually vertical line which is parallel to the right and the left sides of the container and positioned therebetween. When the vertical axis of a container is fixed, the mean (i.e., the center position between the right and the left sides) of the horizontal positions of the right and the left sides of the container is unchanged in all documents. Under this constraint, the width of a container can change. However, the vertical axis is at the same horizontal position in all documents including a document whose right and left sides are the farthest from the vertical axis and a document whose right and left sides are the closest to the vertical axis. The height and the vertical position of a container are unaffected by this constraint.

(g) Similarly, when the horizontal axis is fixed, the top and the bottom sides of a container are set in a vertical direction. However, the width and the height of a container are unaffected by this constraint.

(h) When both of the horizontal and the vertical axes are fixed, this means that the center position of a container is fixed. However, the width and the height of a container are unaffected by this constraint.

(i) When the corner position of a container, the intermediate position of a side of a container, or the center position of the container is fixed, the fixed position is displayed at the same position in the form associated with the container.

(j) A vertical side or axis is fixed in association with the left or right side of a page, a left or right page margin, or another horizontal position. Similarly, a horizontal side or axis is fixed in association with the upper or lower side of a page, an upper or lower page margin, or another vertical position.

A term opposite to the term "fixed" is "variable" which means that the side, axis, corner, or intermediate position of a container, or a document constraint may change among documents.

A container is described so as to have two types, i.e., a text container and an image container. The text container includes an embedded image in addition to a text. However, the image container has only an image.

As illustrated in FIG. 4, a new text container is generated on the document template 309 by clicking the text container tool button 404 with the mouse 133 and dragging a rectangle onto the document template 309. Alternatively, a new image container is generated on the document template 309 by clicking the image container tool button 405 with the mouse 133 and dragging a rectangle onto the document template 309. Further alternatively, a container is simply generated by activating an appropriate tool button (e.g., one of the text container tool button 404 and the image container tool button 40) and then clicking on the document template 309. In addition, in order to insert a container of a default size into the template, or to input dimensions of a new container, a dialog box or another prompt therefor is provided. A certain number of containers are generated and arranged by a schema that is automatically defined or calculated in advance.

When a container is displayed, preferably, each of the states of 36 sides is drawn by a graphical expression. Because some of the states are independently expressed, the number of the states of some sides may be fewer than that of 36 graphic displays. Hereinafter, exemplary side rules of a container are described. FIGS. 5A through 5D are views illustrating typical side rules of a container.

As illustrated in FIGS. 5A through 5D, the layout editing application program 121 draws the sides of a container using solid lines (item 503) or broken lines (item 504) to express the states of the sides thereof. The container has icons of anchors (i.e., lines, figures and icons as indicated by items 506, 507, and 509 drawn near to the sides), handles (control points drawn near to the sides and the figures and used to move or modify the sides as indicated by item 502), and sliders (short parallel lines drawn at both sides of a side (e.g., a slider 413 illustrated in FIG. 4)), scaling icons 505, and a color. The container display rules in FIGS. 5A through 5D are as follows:

(A) Each fixed side is drawn by a solid line.
(B) For a container with a fixed width, the right and left sides thereof are drawn by solid lines.
(C) For a container with a fixed height, the top and the bottom sides are drawn by solid lines.
(D) No axis is drawn.
(E) All sides which are not drawn yet are drawn by broken lines, and an extend/shrink icon is drawn near to each of such sides.
(F) If both of paired crossing sides or axes are fixed, an anchor is drawn at the intersection therebetween.
(G) If no anchor is drawn on a fixed side, a slider is drawn near to the center of that side.
(H) If neither an anchor nor a slider is drawn for the paired crossing sides or axes, a handle is drawn at the intersection therebetween.

The drawing position of a variable side depends on a content assigned to a container.

(a) The broken lines used to draw the side 410 illustrated in FIG. 4 depend on the content assigned to a container, and mean the positions of the sides in a document.
(b) The solid lines mean the constrained sides. This is because such sides (see a side 414 illustrated in FIG. 4) or the width or height of the container is fixed (both of the width and the height of the container 408 illustrated in FIG. 4 are fixed).
(c) An anchor means that the intersection of the sides or axes is fixed. The anchor icon 409 illustrated in FIG. 4 is an example of an anchor which means that the crossing sides 414 are fixed.
(d) A slider means that an associated side is fixed. The position of a container is determined by the "length of the slider" along the side. For example, the sliders 413 illustrated in FIG. 4 mean that the content assigned to the container 408 can be displayed at the left or right side of a position expressed by a specific diagram in a document.

The setting of each of the minimum or maximum values of the width and the height of a container is displayed on a subsidiary dialog window. In a container 501 illustrated in FIG. 5A, both of the width and the height thereof are variable. Fixed sides 503 are expressed by solid lines. Variable sides 504 are expressed by broken lines. Extend/shrink icons 505 indicate that the adjacent sides 504 are variable.

Figure 5B:
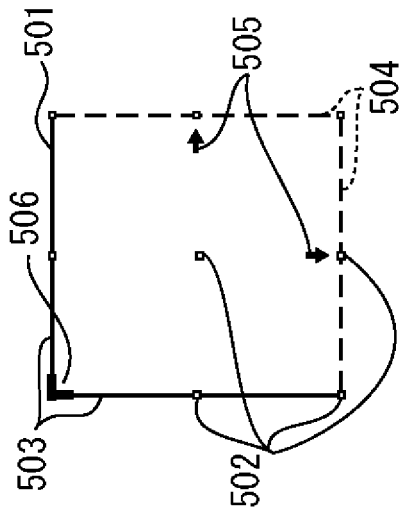
FIGS. 5A through 5D are views illustrating typical container rules according to the exemplary embodiment of the present invention.

Both of the width and the height of a container 501 illustrated in FIG. 5B are variable. An anchor icon 506 means that both of the intersecting sides 503 are fixed.

Figure 5D:
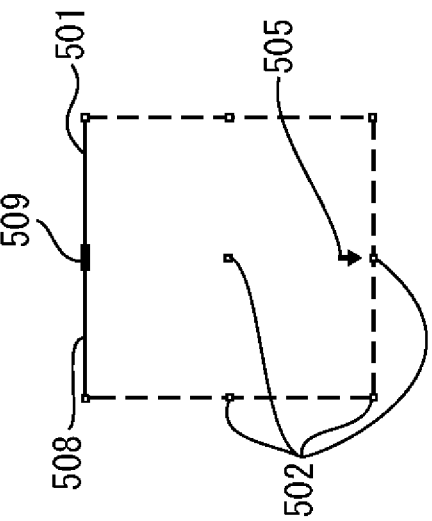
Figure 5A:
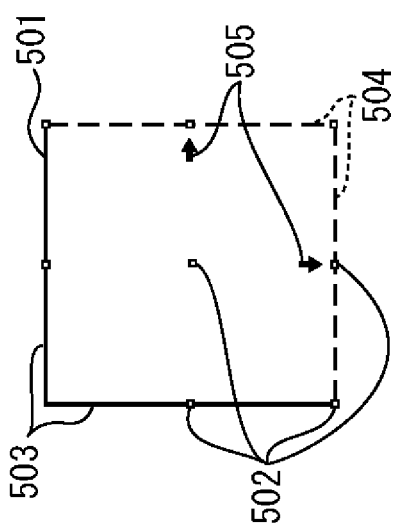
Figure 5C:
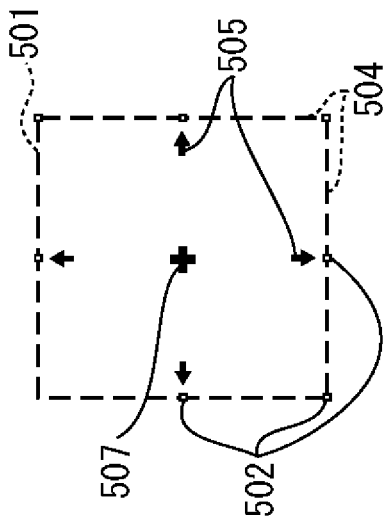

Both of the width and the height of a container 501 illustrated in FIG. 5C are variable in a state in which the container can be equally extended or shrunk from the center point of the container 501 indicated by an anchor 507.

Both of the width and the height of a container 501 illustrated in FIG. 5D are variable except that a top side 508 is fixed. An anchor icon 509 located near to the center of the topside 508 is fixed. An extend/shrink icon 505 indicates that the left side and the right side of the container 501 can be extended or shrunk around a central axis (vertical axis) drawn in the vertical direction so as to pass through the anchor icon 509.

Next, a procedure for setting a link corresponding to containers is described hereinafter. FIG. 6 is a flowchart illustrating the procedure for setting a link corresponding to containers according to the exemplary embodiment of the present invention. Each of processes illustrated in flowcharts of the present application is performed by executing the layout editing application program illustrated in FIG. 2 with the processor 135 illustrated in FIG. 1.

Figure 7A:
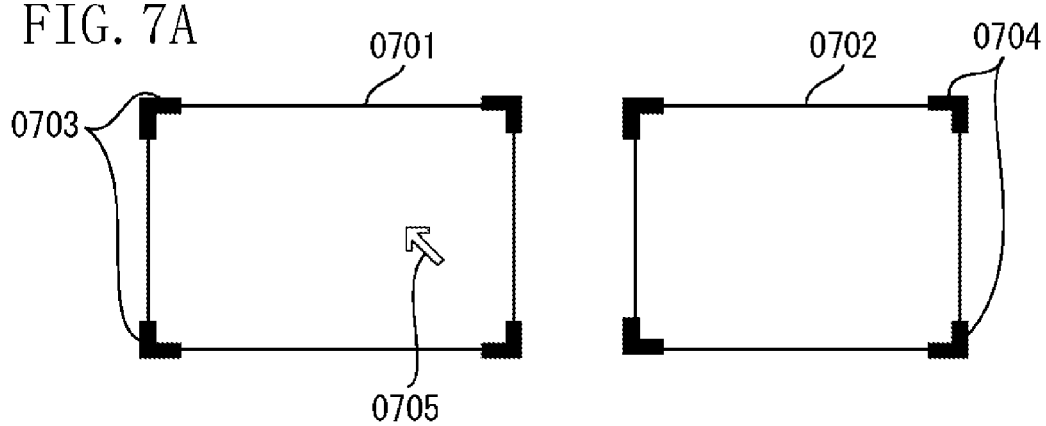
FIGS. 7A through 7C are views illustrating an example of generating two containers and setting a link between the two containers according to the exemplary embodiment of the present invention.
Figure 7B:
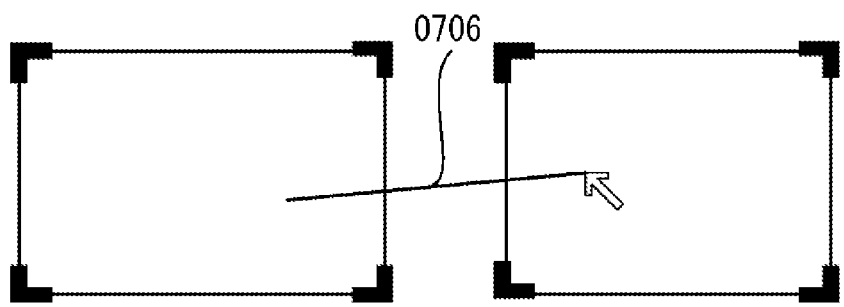
Figure 7C:
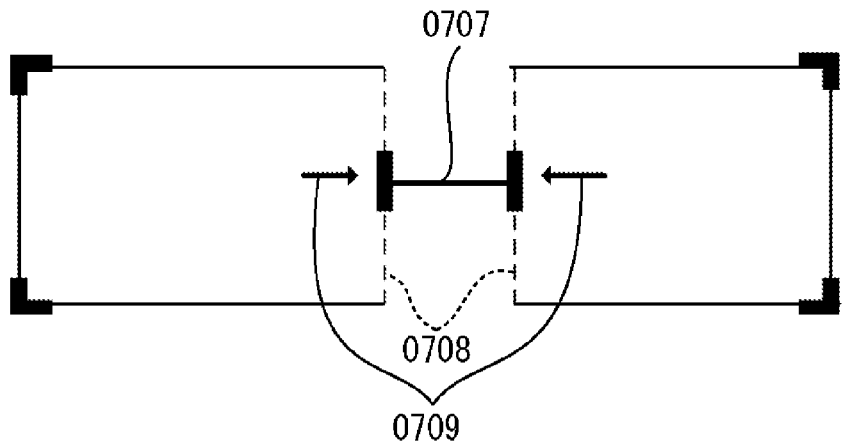

Referring to the flowchart illustrated in FIG. 6, in step S601, the layout editing application program 121 generates a container. It is necessary for setting a link to generate at least two containers to which a link is set. FIGS. 7A through 7C illustrate an example of generating two containers and setting a link between the two containers according to the exemplary embodiment of the present invention. Each of the two containers is generated on the document template 309 illustrated in FIG. 4.

Next, in step S602, the layout editing application program 121 recognizes that a link tool is selected. FIGS. 7A through 7C sequentially illustrate steps of an operation of setting a link. Hereinafter, the steps of this operation are described sequentially in the order illustrated from FIGS. 7A through 7C.

Sides 0701 and 0702 illustrated in FIG. 7A are fixed sides. Anchors 0703 and 0704 are similar to the anchor 409. A cursor pointer 0705 is a mouse pointer.

Turning back to FIG. 6, in step S603, the layout editing application program 121 recognizes that the container is selected. More specifically, a container to which a link is to be set is selected by clicking thereon.

Next, in step S604, the layout editing application program 121 recognizes that the other container to which the link is to be set is selected. For example, as illustrated in FIG. 7B, the mouse pointer 0705 is moved to the other container and clicked thereon. A line 0706 illustrated in FIG. 7B is a straight line which connects the position in FIG. 7A, on which the mouse pointer 0705 is clicked, to the position of the mouse pointer 0705 after the movement of the mouse pointer 0705, and is a UI (user interface) indicating the position at which the link is set.

Next, in step S605, the layout editing application program 121 displays a link UI. More specifically, upon completion of processing in step S604, the layout editing application program 121 displays a link UI 0707 at a position at which the link is set. The container is brought into a state illustrated in FIG. 7C.

In step S606, finally, the layout editing application program 121 changes the UI of the container. That is, the layout editing application program 121 changes the UI of the container based on the fact that the link is set. A side 0708 illustrated in FIG. 7C is formed of a broken line which indicates a variable side, as described above. This processing is performed in order to prevent occurrence of a contradictory phenomenon that although the containers are brought into a state, in which the containers are changed in association with each other, by setting the link, the change of the container is not allowed. An item 0709 is a mark for visually indicating a direction in which the containers can be changed by setting the link, similarly to the item 0505 illustrated in FIG. 5. In an example illustrated in FIG. 7C, the right side of the left-side container and the left side of the right-side container are variably changed. However, this is only an example. For example, the right-side container can be changed into a state set to be similar to that of the slider 413 illustrated in FIG. 4.

Figure 8:
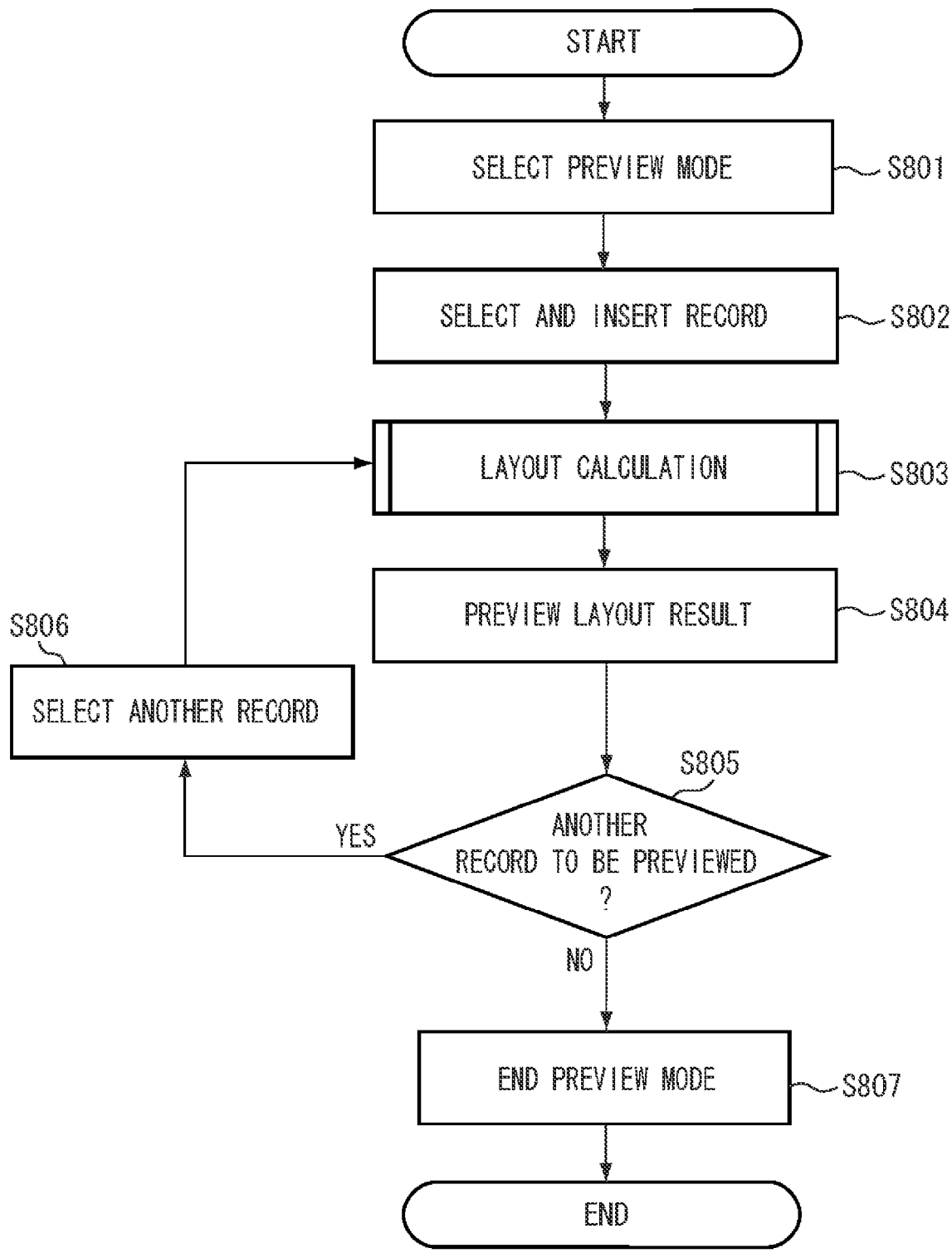
FIG. 8 is a flowchart illustrating the whole procedure of layout calculation processing according to the exemplary embodiment of the present invention.

Next, a layout calculation is described hereinafter. FIG. 8 is a flowchart illustrating the whole procedure of a layout calculation according to the exemplary embodiment of the present invention. As described above, the layout apparatus implements a layout mode in which containers are generated, and then the containers are associated with each other, and in which a template is generated. In addition, the layout apparatus implements a preview mode in which content data included in a record is inserted into a container in the generated template, and in which a layout result is previewed. In the preview mode, actually, the content data included in the record is inserted into the container in the template. Then, a layout calculation is performed. However, in the preview mode, the layout calculation is performed on the display. Even in a case where a layout result is actually printed, a layout calculation is performed by inserting a record into a container. At that time, a similar calculation method is performed.

First, in step S801, the layout editing application program 121 selects a preview mode. In step S802, the layout editing application program 121 selects a record to be previewed. Then, the content data contained in the selected record is inserted into a container. Then, in step S803, the layout editing application program 121 performs a calculation for laying out content data. In step S804, a result of the layout calculation is previewed.

In addition, in step S805, the layout editing application program 121 determines whether another record is previewed. If it is unnecessary to preview another record (NO in step S805), in step S807, the layout editing application program 121 ends the preview mode. On the other hand, if it is necessary to preview another record (YES in step S805), then in step S806, the layout editing application program 121 selects another record to be previewed. Then, the layout editing application program 121 proceeds to step S803.

When the layout apparatus is not in the preview mode but in a mode in which records are printed, the layout editing application program 121 sequentially performs the layout calculation on all records to be printed. Accordingly, there is no necessity for performing processing in step S805 and processing in step S807. Upon completion of printing all records, the layout editing application program 121 ends the process.

Figure 9:
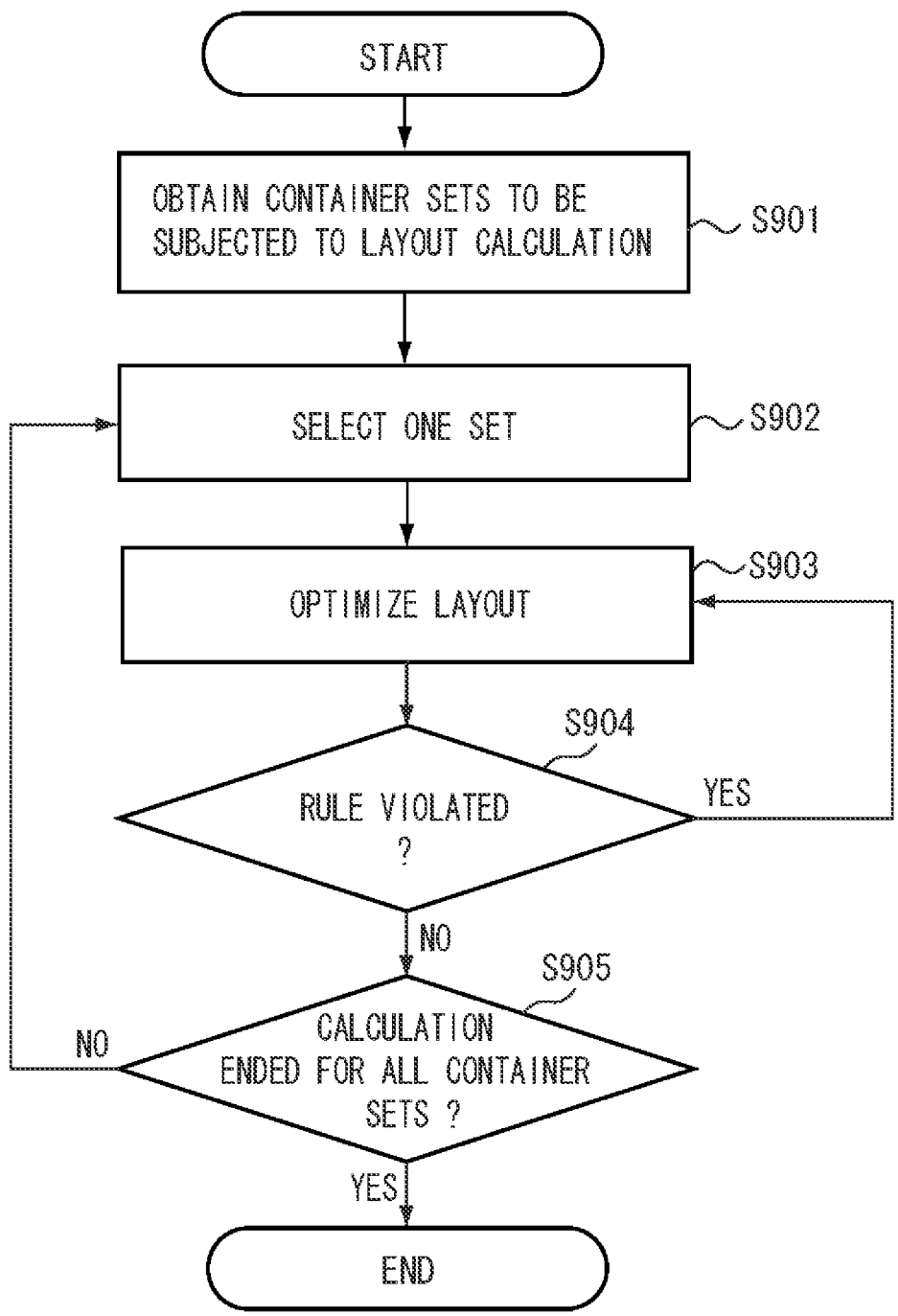
FIG. 9 is a flowchart illustrating the procedure of the layout calculation processing in detail according to the exemplary embodiment of the present invention.

Next, layout calculation processing (to be performed in step S803 illustrated in FIG. 8) is described in detail hereinafter. FIG. 9 is a flowchart illustrating the procedure of the layout calculation processing in detail according to the exemplary embodiment of the present invention.

Referring to the flowchart illustrated in FIG. 9, in step S901, the layout editing application program 121 obtains a set of containers whose layout is to be calculated.

Figure 10:
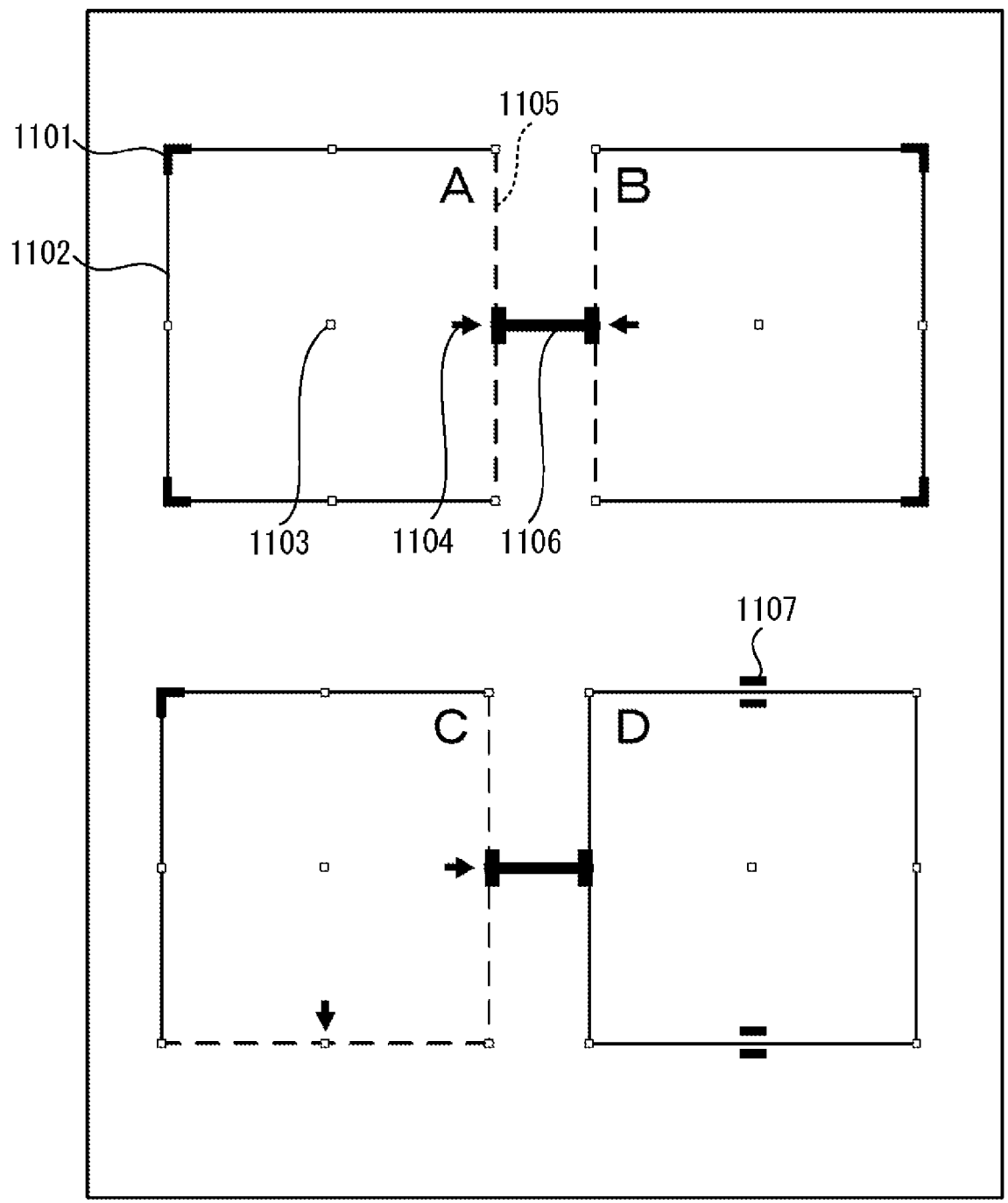
FIG. 10 is a view illustrating a set of containers according to the exemplary embodiment of the present invention when the layout calculation processing is performed.

FIG. 10 illustrates a set of containers according to the exemplary embodiment of the present invention when the layout calculation processing is performed. As illustrated in FIG. 10, four containers A through D are laid out on a page. The container A is associated with the container B by a link, while the container C is associated with the container D by a link. Thus, the set of the containers A and B is referred to as a set 1. The set of the containers C and D is referred to as a set 2. In this case, the display device displays an anchor icon 1101, a side 1102, a controller 1103, an arrow 1104, aside 1105, a link 1106, a slider 1107, and the like on a page, similarly to the case illustrated in FIG. 4. The side 12102 is a fixed side. The side 1105 is a variable side. The arrow 1104 indicates a direction in which the variable side is changed.

Next, in step S902, the layout editing application program 121 selects one of the sets. In this case, the layout editing application program 121 selects one of the sets of the containers obtained in step S901 in order to perform calculate a layout.

Next, in step S903, the layout editing application program 121 optimizes the layout. In this case, a layout calculation is performed on the set of containers selected in step S902. More specifically, the layout is optimized so as to reduce a difference between the sizes of the containers to be laid out and those of actual contents as much as possible. The optimization of the layout is performed so that the differences between the sizes of contents respectively inserted into the associated containers to allow a dynamic change in size and those of the containers to be laid out are possibly equal to each other between the containers.

Then, in step S904, after optimization of the layout, rule violations are checked in S904. The rules are constraints set by a user to the generation of a layout, and include the sizes and positions of containers, the length of a link, and the like. If any rule violation is found (YES in step S904), processing in step S903 is performed again.

On the other hand, if no rule violation is found (NO in step S904), then in step S905, the layout editing application program 121 determines whether the calculation is completed for all of the sets of containers. If the calculation is not ended for all of the sets of containers (NO in step S905), the layout editing application program 121 returns to step S902. On the other hand, if the calculation is completed for all of the sets of containers (YES in step S905), the process ends.

Figure 11A:
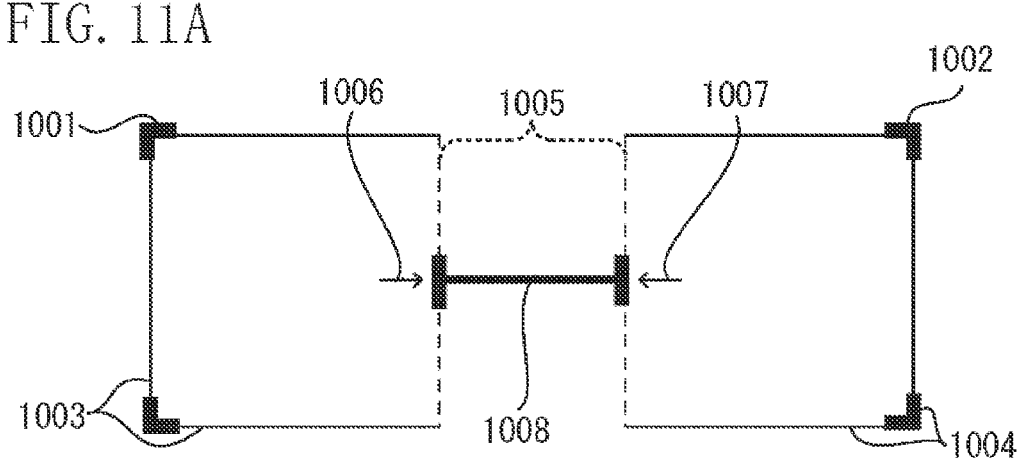
FIGS. 11A through 11C are views illustrating an example of a user interface (UI) according to the exemplary embodiment of the present invention displayed when the layout calculation processing is performed.
Figure 11B:
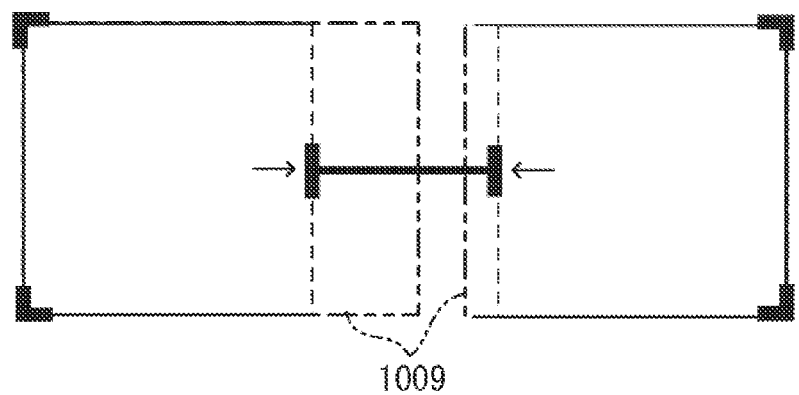
Figure 11C:
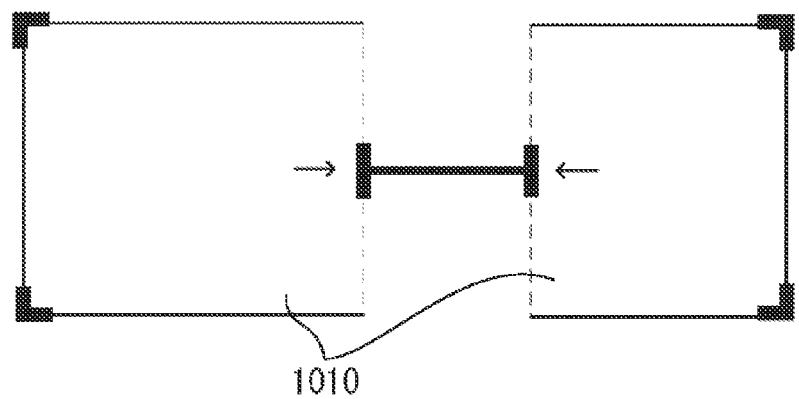

Next, examples of UI displayed when the layout calculation is performed are described hereinafter. FIGS. 11A through 11C illustrate an example of UI displayed when the layout calculation is performed. This UI is generated on, e.g., the document template 309 illustrated in FIG. 4.

FIG. 11A illustrates a state in which a record is inserted into a container and in which a layout is determined. Anchor icons 1001 and 1002, a link 1008, and the like are displayed, similarly to the case illustrated in FIG. 4. Sides 1003 and 1004 are fixed sides, while sides 1005 are variable sides. Arrows 1006 and 1007 indicate directions in which the variable sides are changed.

FIG. 11B illustrates new contents which differ in size from the contents illustrated in FIG. 11A and which are overlaid on the state illustrated in FIG. 11A. In this case, contents 1009 of sizes illustrated in FIG. 11B are inserted into the containers illustrated in FIG. 11A. Then, a layout calculation is performed.

FIG. 11C illustrates a result of the layout calculation. The layout calculation is performed such that a difference in size between the contents obtained by the layout calculation is substantially equal to a difference in size between actually inserted contents, and that no violation of the above rules occurs. In a state illustrated in FIG. 11C, the difference in size between the contents 1010 obtained after the layout calculation is substantially equal to that in size between the actually inserted contents 1009 illustrated in FIG. 11B.

Figure 12:
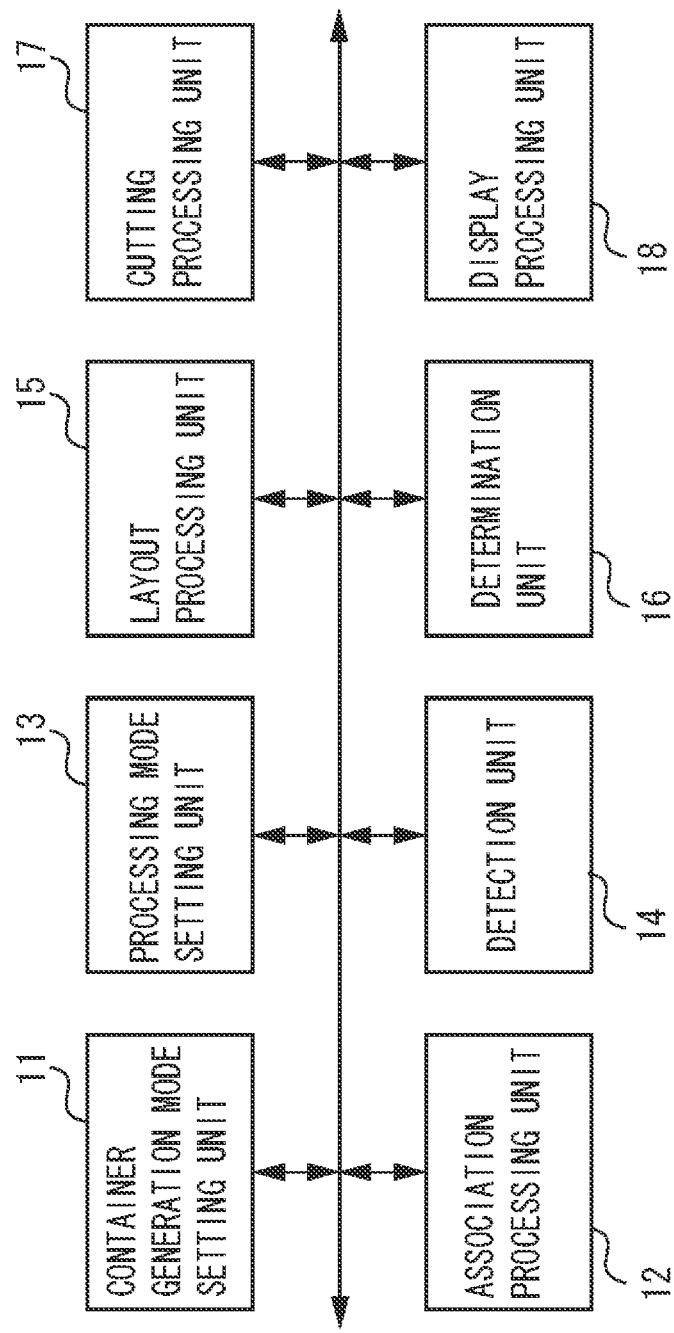
FIG. 12 is a block view illustrating a functional configuration of a layout apparatus according to a first exemplary embodiment of the present invention.

FIG. 12 is a block view illustrating an example of a functional configuration of the layout apparatus according to the first exemplary embodiment of the present invention. Each of the following functional portions is implemented by execution of the layout editing application program 121 by the processor 135. This example is effective in the case of setting two-sided printing.

A container generation mode setting unit 11 sets a container generation mode designated by UI (the details of the container generation mode are described below). An association processing unit 12 associates content data to be flowed into a container designated by the UI. A processing mode setting unit 13 sets a processing mode. For example, when a cutting mode is set, a cutting position is set based on the attribute of the container (the details of the cutting mode are described below). A detection unit 14 detects an execution instruction to perform a layout calculation. A layout processing unit 15 refers to content data associated with each container by the association processing unit 12 and calculates the size of each container. A determination unit 16 determines whether the processing mode set by the processing mode setting unit 13 is a cutting mode. A cutting processing unit 17 adjusts a cutting position set on the front surface of a sheet and a cutting position set on the back surface of the sheet by the processing mode setting unit 13 to each other. The cutting processing unit 17 corrects the size of each container, which is calculated by the layout processing unit 15, such that no contents overlap with each cutting position (the details of this processing are described below). A display processing unit 18 displays a layout result on the UI.

Figure 13:
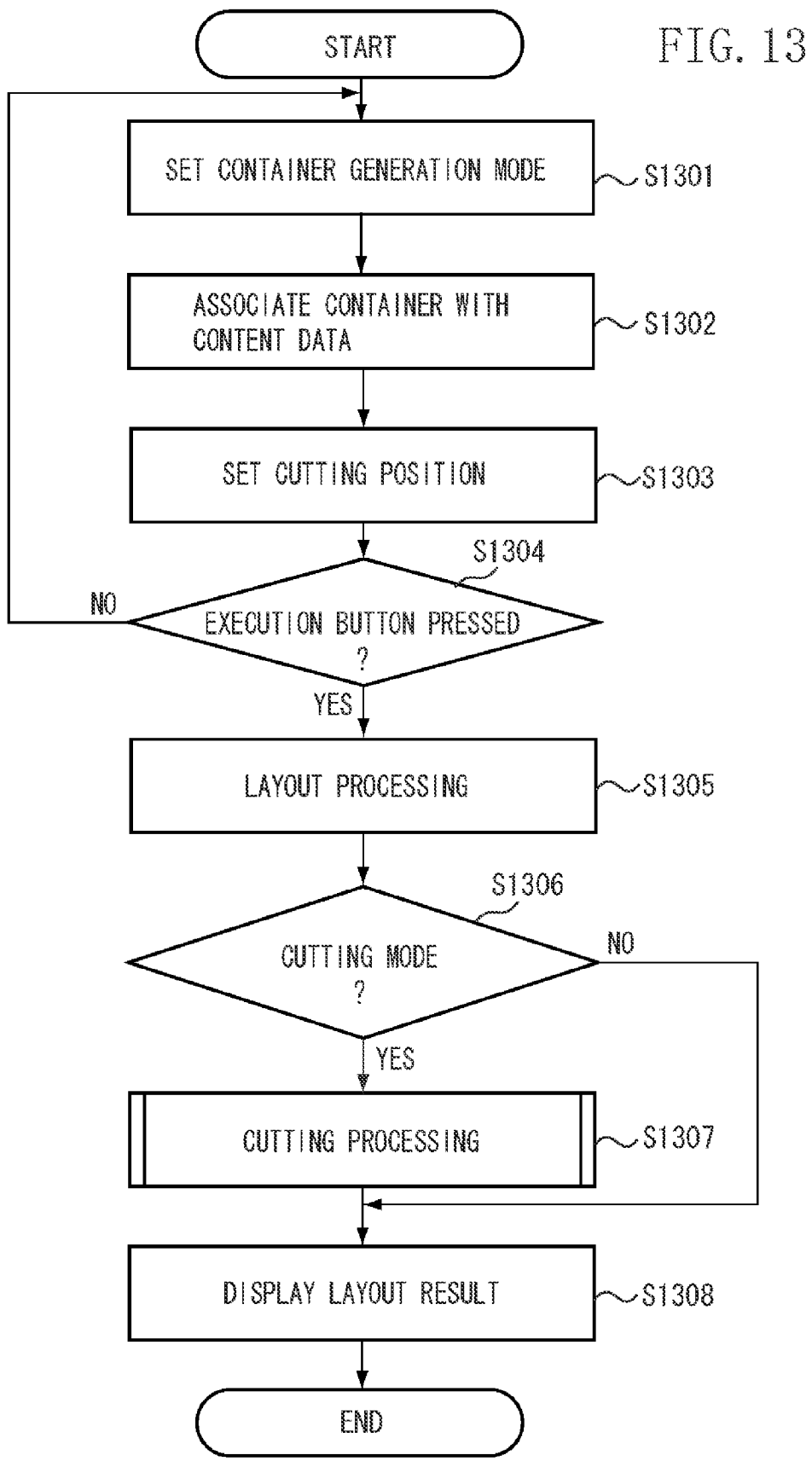
FIG. 13 is a flowchart illustrating the whole procedure performed by the layout apparatus according to the first exemplary embodiment of the present invention.

Next, the whole processing performed by the layout apparatus according to the present embodiment is described hereinafter. FIG. 13 is a flowchart illustrating a procedure for performing the whole processing by the layout apparatus according to the first exemplary embodiment of the present invention. The following processing is described by referring to a UI of the layout apparatus illustrated in FIG. 14.

Figure 14:
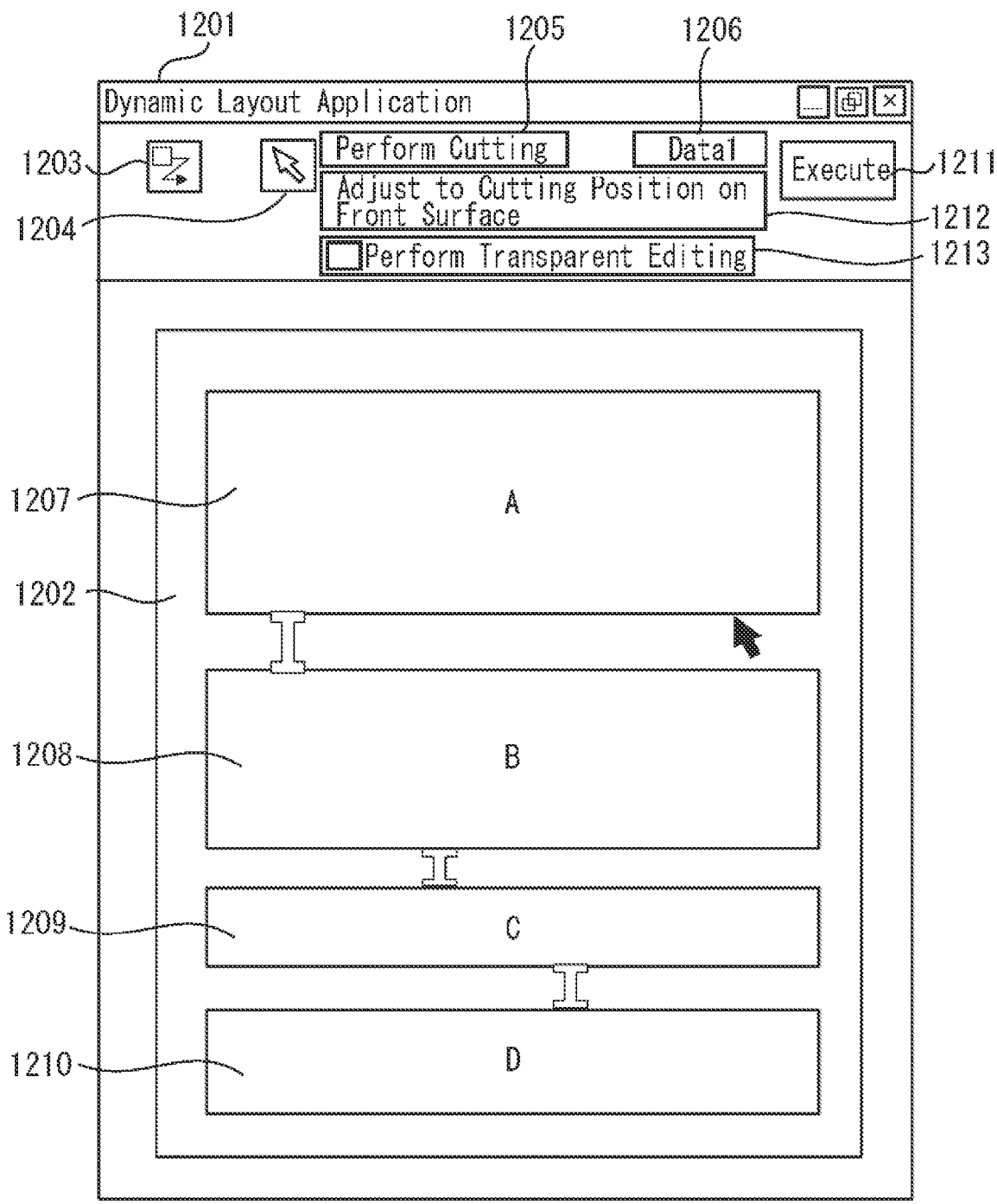
FIG. 14 is a view illustrating an example of a UI of the layout apparatus according to the first exemplary embodiment of the present invention.

In step S1301, the layout editing application program 121 sets a container generation mode in the layout apparatus. This processing is performed as follows. For example, when an icon 1203 illustrated in FIG. 14 is pressed, the mode setting unit 11 illustrated in FIG. 12 sets the container generation mode in the layout apparatus. Then, containers 1207 through 1210 are drawn in a page margin area 1202 by dragging the mouse 133.

Next, in step S1302, the layout editing application program 121 associates the container and the content data with each other. This processing is performed as follows. For example, when a "Data1" icon 1206 illustrated in FIG. 14 is pressed, the association processing unit 12 illustrated in FIG. 12 associates the designated container and the designated content data with each other. The association processing can be performed by designating each field information of the data and each container. Alternatively, the association processing can be implemented as follow. That is, first, a first data file is designated. Then, the first data file is associated with the designated container. Subsequently, other data files are sequentially selected. Each of the selected data files is associated with the designated container. In addition, the layout editing application program 121 sets additional information in the associated container as the post-printing processing attribute thereof. According to the present embodiment, there are three types of such an attribute, i.e., a "cutting attribute", a "non-cutting attribute" and a "no-attribute". Layout processing is performed on a container, whose attribute is the "cutting attribute", by assuming that a part corresponding to this container is used by being cut off after printing is performed. A container having "no-attribute" can be cut off after printing is performed. Such an attribute can be set by being associated with contents inserted into each container.

Next, in step S1303, the layout editing application program 121 sets cutting positions. For example, "Perform Cutting" icon 1205 illustrated in FIG. 14 is pressed. Thus, a cutting mode is selectively set to a "perforating mode" or a "non-perforating mode" as an option to perform cutting processing when layout processing is performed, or another option not to perform cutting processing when layout processing is performed. In addition, for example, an "Adjust to Cutting Position on Front Surface" icon 1212 is pressed. Thus, a cutting method is selectively registered when cutting processing is performed. According to the present embodiment, the following three modes, i.e., the "Adjust to Cutting Position on Front Surface" mode, an "Adjust to Cutting Position on Back Surface" mode, and an "Automatic Adjustment" mode can selectively be registered as a mode of the cutting method. This setting is performed by the processing mode setting unit 13 illustrated in FIG. 12 according to a user's instruction.

Next, in step S1304, the detection unit 14 of the layout editing application program 121 detects whether an "Execute" button 1211 is pressed. If the detection unit 14 cannot detect that the "Execute" button 1211 is pressed (NO in step S1304), the layout editing application program 121 returns to step S1301.

On the other hand, if the detection unit 14 detects that the "Execute" button 1211 is pressed (YES in step S1304), then in step S1305, the layout editing application program 121 performs layout processing. Processing to be performed in step S1305 is to calculate a necessary container size based on the capacity of the content data associated with each container in step S1302. The necessary container size is determined according to the correlative relationship between the capacity of the content data to be flowed into each container and the container size of each container, as described above.

Next, in step S1306, the layout editing application program 121 determines whether the processing mode is a cutting mode. The determination is performed on the mode set by the determination unit 16 illustrated in FIG. 12 in step S1303. If the processing mode is not the cutting mode (NO in step S1306), that is, if the processing mode is the "non-perforating" mode, the layout editing application program 121 proceeds to step S1308.

On the other hand, if the processing mode is the cutting mode (YES in step S1306), that is, if the processing mode is the "perforating" mode, then in step S1307, the layout editing application program 121 performs cutting processing.

Finally, in step S1308, the layout editing application program 121 displays a layout result.

Figure 15:
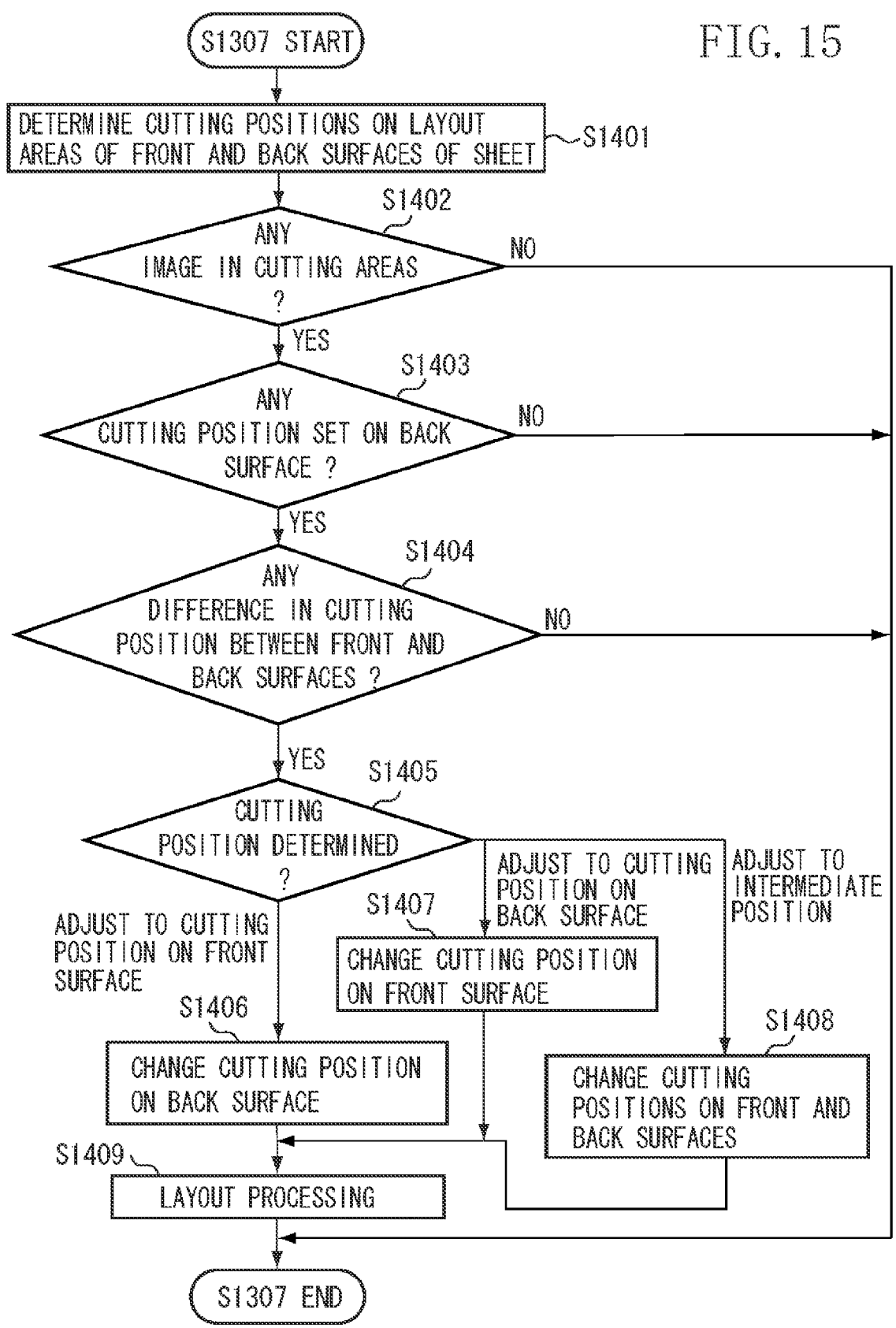
FIG. 15 is a flowchart illustrating a procedure for performing cutting processing according to the first exemplary embodiment of the present invention.

Next, the cutting processing (to be performed in step S1307 illustrated in FIG. 13) is described in detail hereinafter. FIG. 15 is a flowchart illustrating a procedure for performing the cutting processing according to the first exemplary embodiment of the present invention. The following process is performed by the cutting processing unit 17 illustrated in FIG. 12.

Figure 16:
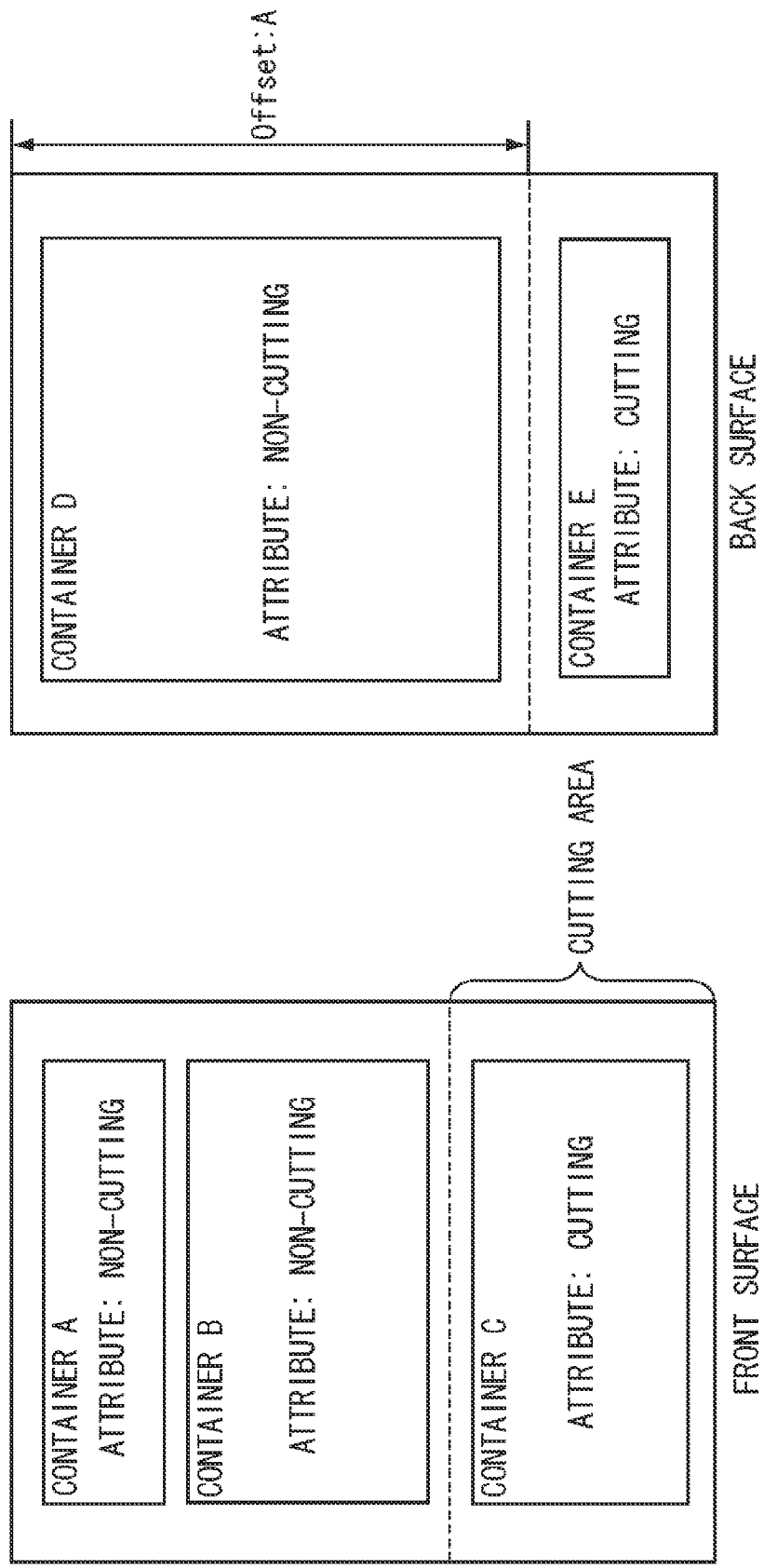
FIG. 16 is a view illustrating an example of setting cutting areas according to the first exemplary embodiment of the present invention.

In step S1401, the cutting processing unit 17 sets cutting positions on front and back layout areas of a sheet. This processing is performed as follows. That is, cutting positions on the front and back layout areas of the sheet are set according to the "cutting attribute" or the "non-cutting attribute" set in the container in step S1302 illustrated in FIG. 13. When this processing is performed, a cutting position is set at the center of a boundary portion between the container having the "non-cutting attribute" and the container having the "cutting attribute". FIG. 16 illustrates a result of this processing.

FIG. 16 illustrates an example of setting cutting areas according to the first exemplary embodiment of the present invention. As illustrated in FIG. 16, on the front surface, attribute change occurs between the container B and the container C. Thus, a cutting line (indicated by a dashed line) is set on the boundary portion between the container B and the container C. Similarly, on the back surface, attribute change occurs between the container D and the container E. Thus, a cutting line is set on the boundary portion between the container D and the container E.

Turning back to FIG. 15, in step S1402, the cutting processing portion 17 determines whether an image is present in a cutting area. If no image is present in the cutting area (NO in step S1402), that is, if no image is present on one of the front surface and the back surface of the sheet, the process ends. Subsequently, processing to be performed in step S1308 illustrated in FIG. 13 is executed.

On the other hand, if an image is present in the cutting area (YES in step S1402), in step S1403, the cutting processing unit 17 determines whether a cutting position is set on the back surface of a sheet. If no cutting position is set on the back surface (NO in step S1403), the cutting processing unit 17 determines that there is no need for adjusting the layout of the cutting position. Thus, the process ends. Subsequently, processing to be performed in step S1308 illustrated in FIG. 13 is executed.

On the other hand, if a cutting position is set on the back surface of the sheet (YES in step S1403), in step S1404, the cutting processing unit 17 determines whether there is a difference between a cutting position on the front surface and a cutting position on the back surface. If there is no difference therebetween (NO in step S1404), the process ends. Subsequently, processing to be performed in step S1308 illustrated in FIG. 13 is executed.

On the other hand, if there is a difference therebetween (YES in step S1404), then in step S1405, the cutting processing unit 17 determines a cutting position. In this case, the cutting processing unit 17 performs this processing according to the cutting mode registered in step S1303 illustrated in FIG. 13.

That is, if the "Adjust to Cutting Position on Front Surface" mode is registered as the cutting mode in step S1303, in step S1406, the cutting processing unit 17 changes the cutting position on the back surface so as to be adjusted to the cutting position on the front surface. For example, if the cutting position on the front surface differs from the cutting position on the back surface, as illustrated in FIG. 16, the cutting position on the back surface is corrected so as to be adjusted to the cutting position on the front surface.

If the "Adjust to Cutting Position on Back Surface" mode is registered as the cutting mode in step S1303, then in step S1407, the cutting processing unit 17 changes the cutting position on the front surface so as to be adjusted to the cutting position on the back surface. For example, if the cutting position on the front surface differs from the cutting position on the back surface, as illustrated in FIG. 16, the cutting position on the front surface is corrected so as to be adjusted to the cutting position on the back surface.

If the "Automatic Adjustment" mode is registered as the cutting mode in step S1303, then in step S1408, the cutting processing unit 17 determines an intermediate position between the cutting position on the front surface and the cutting position on the back surface as a cutting position. For example, if the cutting position on the front surface differs from the cutting position on the back surface, as illustrated in FIG. 16, the cutting processing unit 17 calculates the intermediate position between the cutting position on the front surface and the cutting position on the back surface. Then, each of the cutting position on the front surface and the cutting position on the back surface is corrected so as to be adjusted to the calculated intermediate position as a new cutting position.

Figure 17:
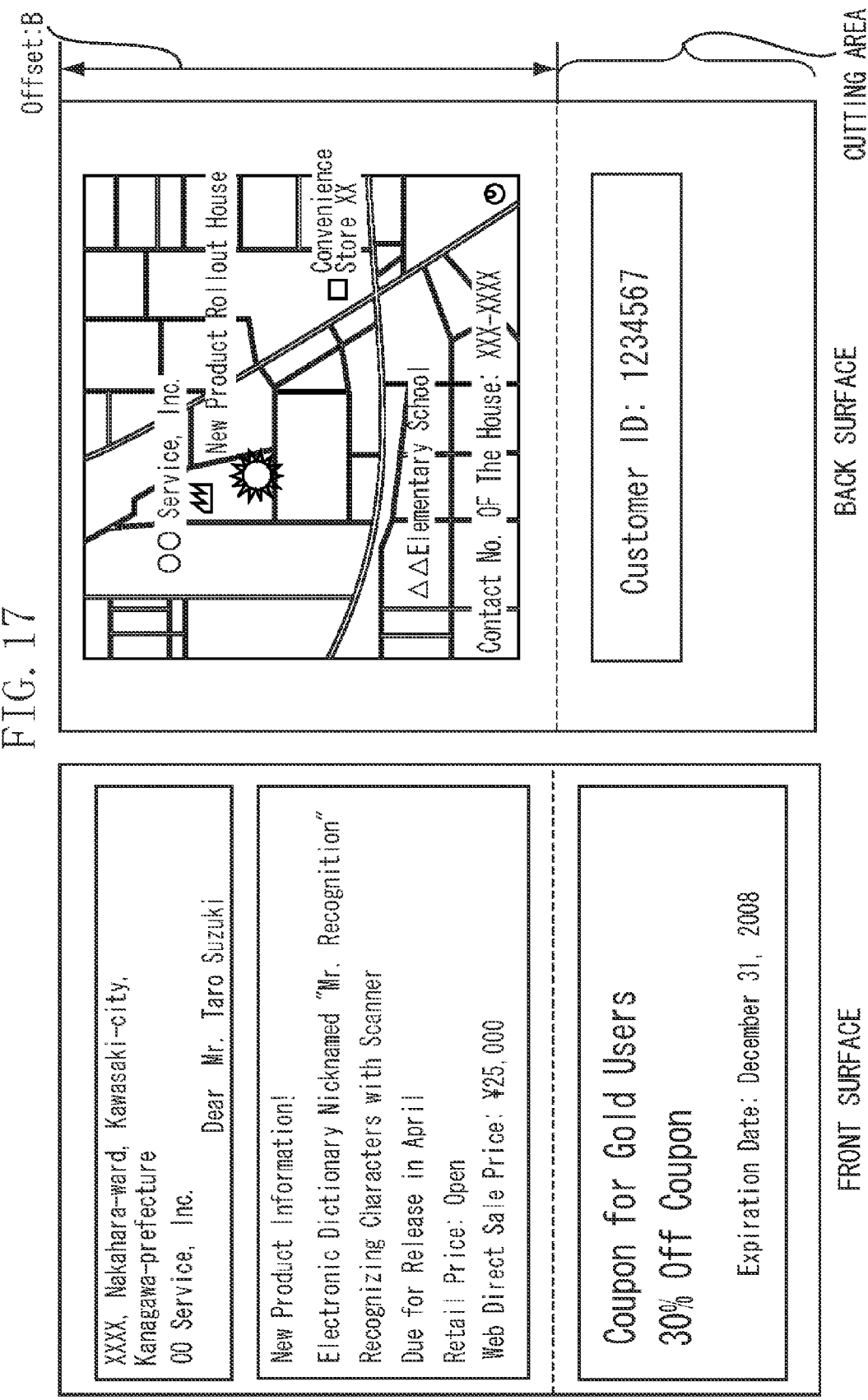
FIG. 17 is a view illustrating re-layout processing according to the first exemplary embodiment of the present invention after a new cutting line is determined.

Then, in step S1409, the cutting processing unit 17 performs layout processing. More specifically, the cutting processing unit 17 calculates a container size according to the cutting position determined in steps S1406 through S1408. Then, the cutting processing unit 17 performs re-layout processing. Hereinafter, a method for calculating the container size is briefly described with reference to FIGS. 16 and 17. FIG. 17 illustrates how the re-layout processing is performed according to the first exemplary embodiment of the present invention after a new cutting line is determined.

For example, a size in the longitudinal direction of a sheet is assumed to be "L". A distance (or offset) from the top end of the sheet to the cutting position before the processing in step S1406 is performed is assumed to be "A". A distance (or offset) from the top end of the sheet to the cutting position determined after the processing in step S1406 is performed is assumed to be "B". A scaling ratio A/B is calculated as a ratio of the offset A to the offset B. The container size of the container D is determined by applying the scaling ratio to the size in the longitudinal direction of the container D. Similarly, a scaling ratio (L−A)/(L−B) corresponding to the container E is calculated employing the cutting position as a reference. Then, the container size of the container E is determined by applying the latter scaling ratio to the size in the longitudinal direction of the container E. The re-layout processing is similarly performed after the processing in each of steps S1407 and S1408.

As a result of performing the above processing, the layout apparatus according to the present embodiment can output a layout result in which the contents do not overlap with the cutting position on each of the front surface and the back surface of the sheet, as illustrated in FIG. 17. In the foregoing description of the present embodiment, a method for correcting the size of the layout frame has been discussed as a practical example of the layout processing. The layout processing according to the present invention is not limited thereto. For example, as long as a user's desired layout result can be obtained by correcting, e.g., the position of a cutting line or a layout frame, the layout processing according to the present invention can be a method for correcting only the positions of a cutting line and a layout frame.

Figure 18:
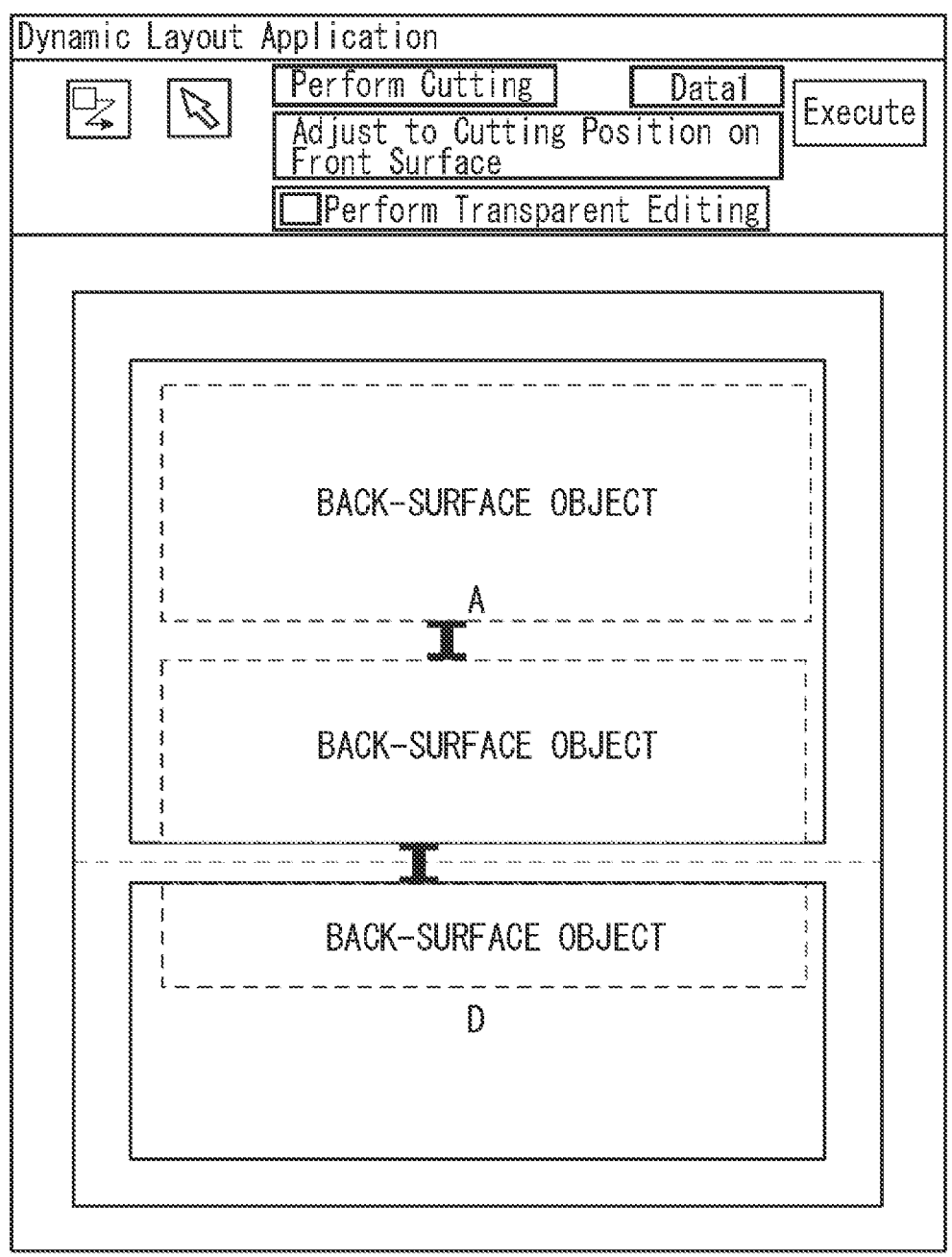
FIG. 18 is a view illustrating an example of a transparent editing display according to the first exemplary embodiment of the present invention.

When the setting of a transparent editing mode 1213 illustrated in FIG. 14 is on, the following processing is performed as the processing to be performed in step S1308 illustrated in FIG. 13. That is, when the scaling ratio to be used in the layout processing in step S1409 is outside a preliminarily set range of a threshold value, the layout editing application program 121 determines that there is a problem in performing an automatic layout. When the threshold value is outside the preset range, the display processing unit 18 displays a back surface container superimposed on (ORed with) a front surface container of a sheet. Thus, the containers can manually be edited. In this case, a transparent container is displayed with a dashed line or the like in a discriminable form (a superimposition display is referred to as a transparent editing display). FIG. 18 illustrates an example of a transparent editing display according to the first exemplary embodiment of the present invention. A transparent editing display can be implemented by superimposing a container, which is set on the front surface, on a container set on the back surface.

According to the present embodiment, a cutting position in the layout for printing a cutting line is set according to the attribute of the container. When a cutting position on the front surface differs from a cutting position on the back surface, contents on each of the front surface and the back surface are laid out such that the cutting position on the front surface and the cutting position on the back surface are adjusted to each other. Thus, even when the cutting position on the front surface differs from the cutting position on the back surface, re-layout can be performed so that the cutting position on the front surface and the cutting position on the back surface are adjusted to each other, and that the size of a container, into which contents are inserted, is changed to an appropriate size for the adjusted cutting position. Accordingly, even when the sheet is cut at the adjusted cutting position, the contents can be prevented from being unnaturally separated from one another.

As described above, according to the first exemplary embodiment, the layout can be implemented so that the cutting position on the front surface and the cutting position on the back surface are adjusted to each other. However, when a plurality of cutting positions are present, it is necessary to perform an operation of setting the same number of cutting positions on each of the front surface and the back surface. When the same information is set in each cutting area, a user should perform such setting. Thus, cumbersome processing is required. A second exemplary embodiment of the present invention aims at solving such inconvenience.

Figure 19:
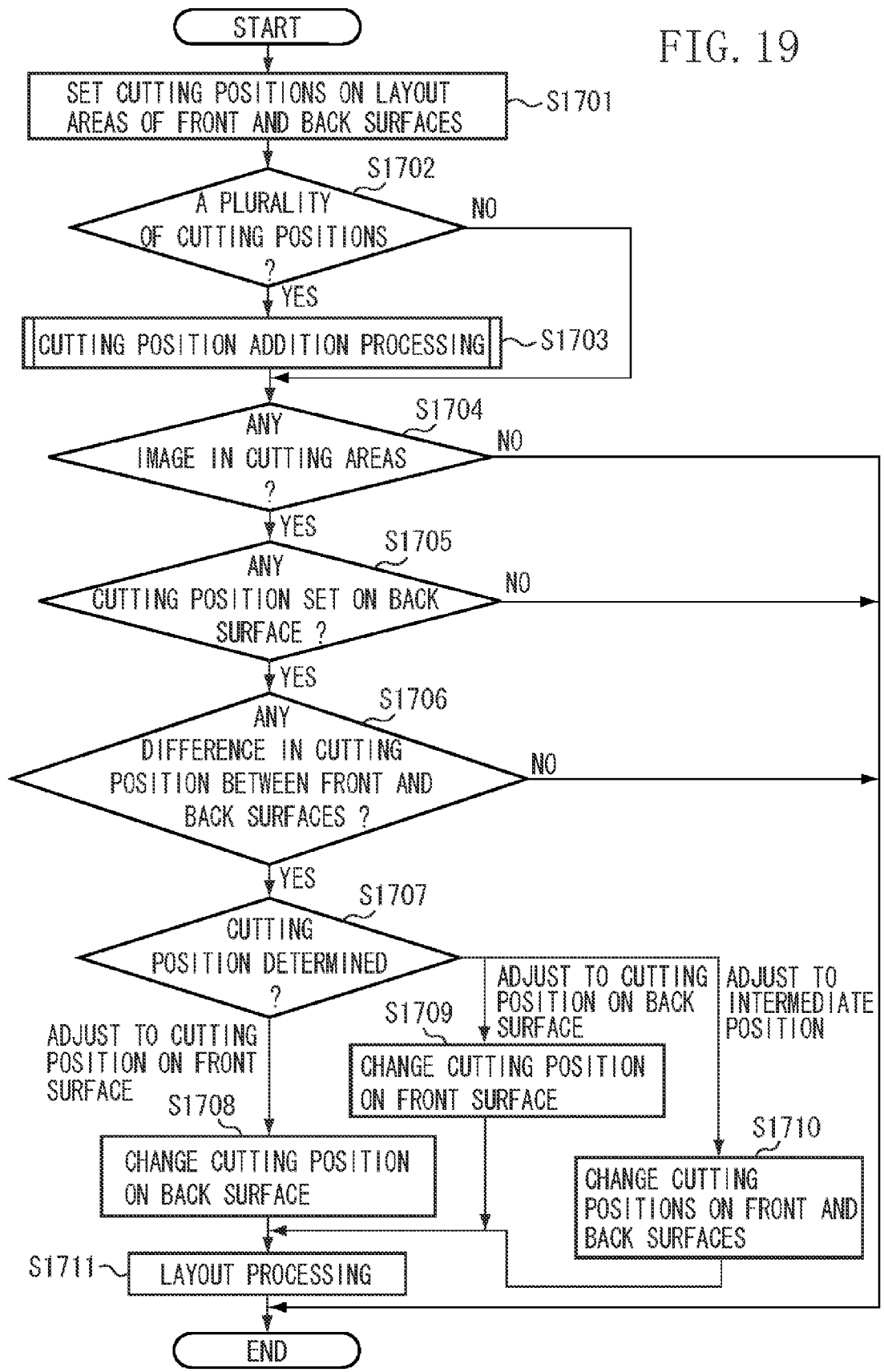
FIG. 19 is a flowchart illustrating a procedure for performing cutting processing according to a second exemplary embodiment of the present invention.

According to the present embodiment, in order to solve the above inconvenience when a plurality of containers having the cutting attribute are present, the cutting processing described in the description of the first exemplary embodiment, which is performed in step S1307 illustrated in FIG. 13, is executed by performing a procedure illustrated in FIG. 19. FIG. 19 is a flowchart illustrating the procedure for performing the cutting processing according to the second exemplary embodiment of the present invention. The following process is performed by the cutting processing unit 17 illustrated in FIG. 12.

Referring to the flowchart illustrated in FIG. 19, in step S1701, the cutting processing unit 17 sets a cutting position on each of front and back layout areas of a sheet. This processing is similar to the processing performed in step S1401 illustrated in FIG. 14. Thus, detailed description thereof is omitted.

Next, in step S1702, the cutting processing unit 17 determines whether a plurality of cutting positions are present on each of the front and back layout areas. If only a single cutting position is present thereon (NO in step S1702), the cutting processing unit 17 proceeds to step S1704.

On the other hand, if a plurality of cutting positions are present thereon (YES in step S1702), then in step S1703, the cutting processing unit 17 performs cutting position addition processing. The cutting position addition processing is described in detail below.

Processing to be performed in steps S1704 through S1711 is basically similar to the processing performed in steps S1402 through S1409 illustrated in FIG. 14. Thus, description is focused on and given of the difference therebetween below. As a result of performing processing in step S1703, a plurality of cutting lines are set on the front surface. Similarly, a plurality of cutting lines are set on the back surface. Then, in steps S1708 through S1710, position adjustment processing (corresponding to processing to be performed in steps S1406 though S1408) is performed. In the process illustrated in FIG. 17, the position adjustment processing is performed a plurality of times respectively corresponding to a plurality of cutting lines. That is, the cutting lines are sequentially detected on each of the front surface and the back surface from the top end of the sheet. First, the position adjustment processing is performed so that the position of a first detected cutting line on the front surface and the position of a first detected cutting line on the back surface are adjusted to each other. After that, the position adjustment processing is performed so that the position of the next detected cutting line on the front surface and the position of the next detected cutting line on the back surface are adjusted to each other. This processing is repeated on all of the detected cutting lines.

Figure 20:
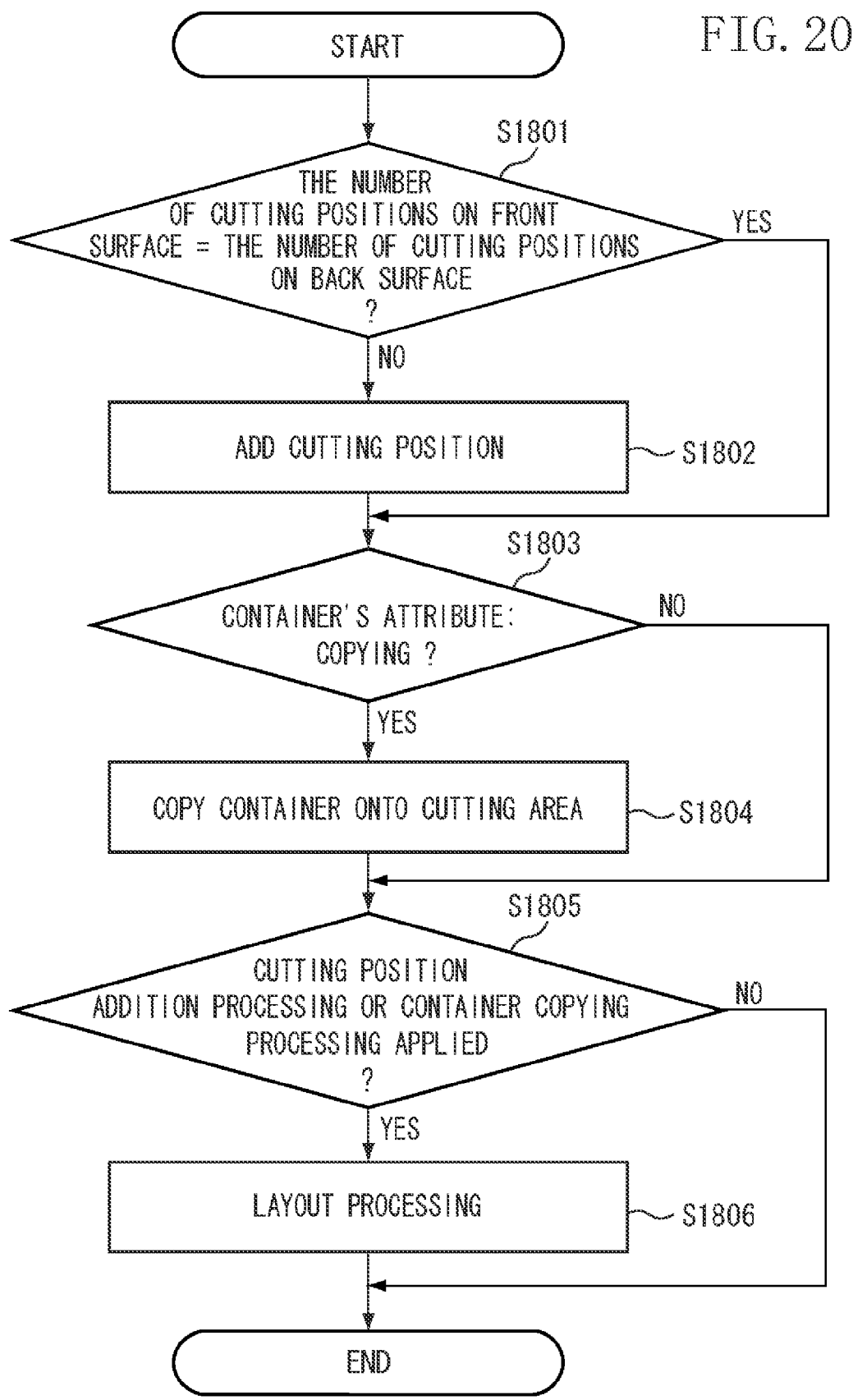
FIG. 20 is a flowchart illustrating a procedure for performing cutting position addition processing according to the second exemplary embodiment of the present invention.

Next, the cutting position addition processing (to be performed in step S1703 illustrated in FIG. 19) is described in detail hereinafter. FIG. 20 is a flowchart illustrating a procedure for performing the cutting position addition processing (to be performed in step S1703 illustrated in FIG. 19) according to the second exemplary embodiment of the present invention.

In step S1801, the cutting processing unit 17 detects whether the number of the cutting positions on the front surface is equal to that of the cutting positions on the back surface. If the number of the cutting positions on the front surface is equal to that of the cutting positions on the back surface (YES in step S1801), the cutting processing unit 17 proceeds to step S1803.

On the other hand, if the number of the cutting positions on the front surface is not equal to that of the cutting positions on the back surface (NO in step S1801), then in step S1802, the cutting processing unit 17 adds one or more cutting positions. Hereinafter, this processing is described with reference to FIG. 21.

FIG. 21 illustrates an example of the cutting position addition processing according to the second exemplary embodiment of the present invention. In the example illustrated in FIG. 21, two cutting positions are present on the front surface, while only a single cutting position is present on the back surface. Thus, the cutting position addition processing is performed on the back surface. A new additional cutting position is added to the bottom end of the existing cutting areas.

Turning back to FIG. 20, in step S1803, the cutting processing unit 17 determines whether a copying attribute is set in a container. The copying attribute indicates that the container is copied to each cutting area on the same surface. The copying attribute can be set by a user in step S1302. An attribute, such as user identification (ID), of content data to be flowed into a container can be used as a keyword. If no containers have a copying attribute (NO in step S1803), the cutting processing unit 17 proceeds to step S1805.

On the other hand, if the container has a copying attribute (YES in step S1803), then in step S1804, the cutting processing unit 17 copies and sets the container to and in a new cutting area. FIG. 21 illustrates a result of this processing.

Next, in step S1805, the cutting processing unit 17 determines whether the cutting position addition processing or container copying processing is applied. In this case, the cutting processing unit 17 determines whether processing in step S1802 or processing in step S1804 is applied. If the cutting position addition processing or container copying processing is not applied (NO in step S1805), the process ends. On the other hand, if the cutting position addition processing or container copying processing is applied (YES in step S1805), then in step S1806, the cutting processing unit 17 performs layout processing. This layout processing is similar to the layout processing performed in step S1711 illustrated in FIG. 19. If the processing in the above steps ends, the cutting processing unit 17 proceeds to step S1704 illustrated in FIG. 19.

As a result of performing the above process, even when a plurality of cutting positions are present on the front or back surface, and the number of cutting positions on the front surface differs from that of cutting positions on the back surface, the layout apparatus according to the present embodiment can adjust the cutting positions on the front surface and the cutting positions on the back surface to one another and perform re-layout processing to change the container sizes to appropriate sizes for the adjusted cutting positions. Accordingly, even when the sheet is cut at the adjusted cutting positions, the contents can be prevented from being unnaturally separated from one another. Even when the same information is printed on each cutting area, this information can be copied by setting this information the copying attribute in the container as the copying attribute. Thus, there is no inconvenience.

When the layout processing is performed according to the first or second exemplary embodiment of the present invention, there is a fear of occurrence of the following inconvenience. That is, the container size corresponding to the contents is small, so that the container is put into an overflow state. Thus, the legibility of a document is degraded. The overflow state is a state in which the text size becomes smaller than a predetermined size, because of the fact that the container size is small.

Accordingly, a third exemplary embodiment of the present invention aims at eliminating the inconvenience by inserting a container into an empty space on a back surface, which is cut off along a cutting line, and flowing content data, whose capacity is large so as to cause an overflow of the container, into the inserted container.

According to the present embodiment, in order to eliminate the above inconvenience, the cutting processing described in the description of the first exemplary embodiment, which is performed in step S1307 illustrated in FIG. 13, is executed by performing a procedure illustrated in FIG. 22. FIG. 22 is a flowchart illustrating a procedure for performing the cutting processing according to the third exemplary embodiment of the present invention.

In step S2001, the cutting processing unit 17 performs the cutting processing. This cutting processing is illustrated by the entire flow chart shown in FIG. 15. Thus, the description of the cutting processing is omitted.

Next, in step S2002, the cutting processing unit 17 generates container arrangement information. In this case, the cutting processing unit 17 generates overflowing-container arrangement information based on a result of processing performed in step S2001. For example, the cutting processing unit 17 checks the size of characters in each container and determines whether the size of the characters is smaller than a predetermined value. The predetermined value of the character size to be used for the determination can be included in the program. Alternatively, the predetermined value of the character size can be designated by a user using an external file or a UI screen. The layout apparatus stores surface information (corresponding to each of the front and the back surfaces) and area information (corresponding to each of cutting areas and non-cutting areas) as the container arrangement information representing containers, the character size corresponding to which is equal to or less than the predetermined value.

FIG. 23 illustrates an example of a case where there is an overflow place in a non-cutting area on a surface of a sheet. FIG. 24 illustrates an example of container arrangement information generated on the basis of the example of the case illustrated in FIG. 23.

Turning back to FIG. 22, in step S2003, the cutting processing unit 17 determines whether there is an overflowing container. If there is no overflowing container (NO in step S2003), that is, if there is no overflowing place in all of the areas on the front and back surfaces represented by the container arrangement information, the process ends. Then, the cutting processing unit 17 proceeds to step S1308 illustrated in FIG. 13. On the other hand, if there is an overflowing container (YES in step S2003), then in step S2004, the cutting processing unit 17 performs container insertion processing. The container insertion processing is described in detail below.

Figure 25:
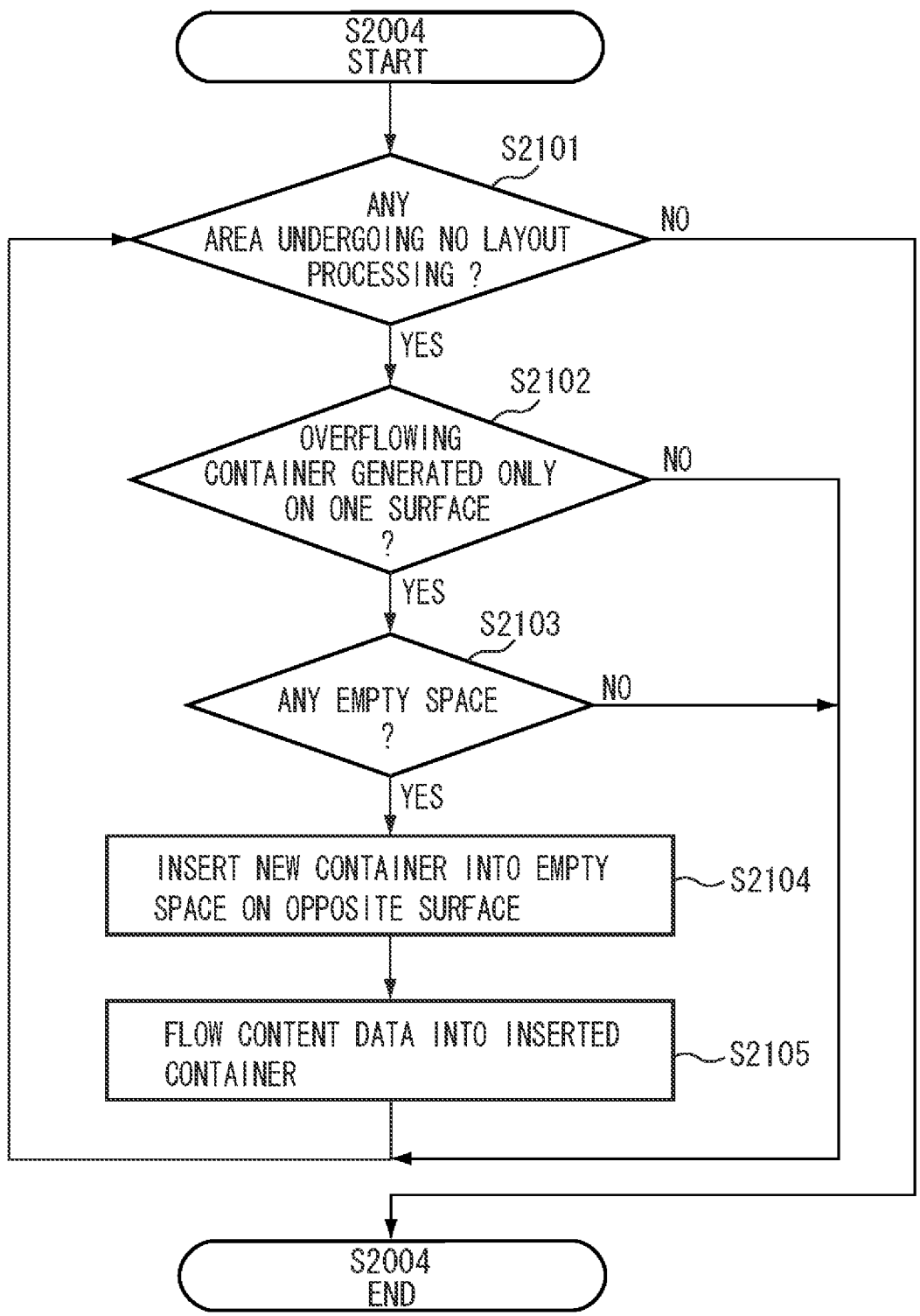
FIG. 25 is a flowchart illustrating a procedure for performing container insertion processing according to the third exemplary embodiment of the present invention.

FIG. 25 is a flowchart illustrating a procedure for performing container insertion processing (to be performed in step S2004 illustrated in FIG. 22) according to the third exemplary embodiment of the present invention.

In step S2101, the cutting processing unit 17 detects whether there is an area the layout processing on which is not ended. In this case, the cutting processing unit 17 detects whether the layout processing performed on each area to be separated along a cutting line ends. If there is no area the layout processing on which is not ended (NO in step S2101), the process ends. Then, the cutting processing unit 17 proceeds to step S1308.

On the other hand, if there is an area the layout processing on which is not ended (YES in step S2101), then in step S2102, the cutting processing unit 17 determines whether an overflowing area is present only on one of the front and the back surfaces. If it is not detected that an overflowing area is present only on one of the front and the back surfaces (NO in step S2102), the cutting processing unit 17 returns to step S2101. For example, if overflowing areas are present on both of the front and the back surfaces, the cutting processing unit 17 determines that there is no empty space. Then, the cutting processing unit 17 returns to step S2101, without performing the processing. If no overflowing container is present on each of the front and the back surfaces, the cutting processing unit 17 determines that there is no necessity for performing the processing. Then, the cutting processing unit 17 returns to step S2101.

On the other hand, if an overflowing container is present only one of the front and the back surfaces (YES in step S2102), then in step S2103, the cutting processing unit 17 determines whether there is an empty space. More specifically, the cutting processing unit 17 determines whether there is an empty space, into which a container can be inserted, on a surface opposite to the surface on which an overflowing container is present. The "empty space" is defined to be a space whose size is equal to or larger than a predetermined value. That is, the cutting processing unit 17 determines a space, whose size is equal to or larger than the predetermined value, to be an empty space. Alternatively, if the character size is equal to or larger than the predetermined value when content data is flowed into a container inserted in a space, the space can be determined to be an empty space. If there is no empty space (NO in step S2103), the cutting processing unit 17 returns to step S2101.

On the other hand, if there is an empty space (YES in step S2103), then in steps S2104, the cutting processing unit 17 inserts a new container into an empty space on a surface opposite to the surface on which an overflowing container is present. According to this method, a place into which a new container is inserted is an empty space. However, the following method is effective. That is, on the back surface of the sheet, a new container is inserted into a place in front of a leading container (i.e., a document starting container in each separated area). On the front surface of the sheet, a new container is inserted into a place in rear of a tailing container (in the separated area).

Next, in step S2105, the cutting processing unit 17 flows content data into the inserted container. More specifically, the cutting processing unit 17 flows content data of an amount, which is equal to the capacity of data overflowing from the container, into the new container inserted in an area on the opposite-side surface. According to this processing, a container size obtained as a total of the size of the overflowing container and the size of the inserted container, and a character size obtained according to the number of characters included in the contents are determined. Then, the cutting processing unit 17 determines the number of characters to be flowed thereinto on the basis of the determined character size. In addition, the cutting processing unit 17 flows content data into the overflowing container and the inserted container by dividing the content data, based on the determined number of characters. After that, the cutting processing unit 17 returns to step S2101.

FIG. 26 illustrates an example of flowing contents into the inserted container. More specifically, FIG. 26 illustrates an example of the following process. That is, first, the processing according to the present embodiment is performed on the area illustrated in FIG. 23. Then, a container is inserted into the area on the back surface. Subsequently, a character string overflowing from the overflowing container is flowed into the inserted container.

As a result of performing the above process, even when a container is brought into an overflow state by performing cutting layout processing, content data, whose amount is equal to the capacity of data overflowing the overflowing container, can be flowed into an empty space on the opposite-side surface. Consequently, the third exemplary embodiment has advantages in that the character size can appropriately be set when layout processing is performed, and that a distinct document can be generated, in addition to the advantages of the first and the second exemplary embodiments.

The process according to the third exemplary embodiment can be executed by the layout editing application program. However, a printer driver can execute the process according to the present embodiment.

In the foregoing description, the cutting position of a cutting line according to the present invention has been described by way of example. However, the separation position for separating layout frames according to the present invention is not limited thereto. The present invention can be applied to the separation position for separating the layout frame into which contents are flowed. The present invention can be applied to, e.g., a folding position when a folding line indicating a crease is printed.

The object of the present invention can be accomplished by supplying an apparatus with a storage medium in which a software program code implementing the above functions is stored, and causing a computer (or CPU or a microprocessor unit (MPU)) of the apparatus to read out and execute the program code stored in the storage medium. In this case, the program code itself read from the storage medium implements the functions of the above embodiment. Thus, a storage medium on which the program code is stored constitutes the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-024148 filed Feb. 4, 2009, which is hereby incorporated by reference herein in its entirety.

What is claimed is:

1. A layout apparatus for performing layout by arranging a plurality of layout frames on regions respectively corresponding to both of a front and a back surfaces of a sheet, the layout apparatus having a processor comprising:

a separation information setting unit configured to set separation information for separating the plurality of layout frames on each of the front and back surfaces;

a separation position setting unit configured to set, based on the separation information set by the separation information setting unit, a separation position on at least one of the regions on each of the front and back surfaces of the sheet such that the region corresponding to the set separation position is separated at the set separation position into areas on each of which the layout frames to be separated do not coexist; and a correction unit configured to correct at least one of the separation position, a size of each layout frame, and a position of each layout frame so that the layout frames do not overlap with one another at the separation position set by the separation position setting unit on the front and the back surfaces of the sheet, and that the layout frames to be separated do not coexist in each of the areas into which the region is separated at the separation position, on the front and the back surfaces, wherein the correction unit is further configured to perform correction to add one or more new separation positions when a number of separations on the front surface of the sheet differs from a number of separation positions on the back surface of the sheet so that the number of separation positions on the front surface is equal to the number of separation positions on the back surface.

2. The layout apparatus according to claim 1, wherein the separation position setting unit sets a separation position on each of the regions respectively corresponding to the front surface and the back surface of the sheet.

3. The layout apparatus according to claim 2, wherein the correction unit adjusts the separation position on the back surface of the sheet to the separation position on the front surface of the sheet, which is set by the separation position setting unit.

4. The layout apparatus according to claim 2, wherein the correction unit adjusts the separation position on the front surface of the sheet to the separation position on the back surface of the sheet, which is set by the separation position setting unit.

5. The layout apparatus according to claim 2, wherein the correction units corrects the separation position to an intermediate position between the separation position on the front surface of the sheet and the separation position on the back surface, which are set by the separation position setting unit.

6. The layout apparatus according to claim 2, wherein the separation position setting unit sets, when the number of the separation positions on the front surface of the sheet differs from the number of the separation positions on the back surface of the sheet, one or more new separation positions so that the number of the separation positions on the front surface is equal to the number of the separation positions on the back surface.

7. The layout apparatus according to claim 6, wherein the correction unit copies and arranges a layout frame arranged in a region to and in another region in which a layout frame generated by setting the new separation position is not arranged.

8. The layout apparatus according to claim 7, wherein the separation information setting unit is capable of setting copying information for copying the layout frame as separation information, and copies and arranges a layout frame in which the copying information is set.

9. The layout apparatus according to claim 1, wherein when a layout frame to be overflowed by flowing contents thereinto is present, the correction unit arranges a new layout frame in a region on an opposite-side surface opposite to the surface, on which the layout frame to be overflowed is arranged, such that the region on the opposite-side surface includes a layout frame which is not to be separated from the layout frame to be overflowed, according to the separation information, and the correction unit flows, into the new layout frame, a part of contents to be flowed into the layout frame to be caused to overflow.

10. The layout apparatus according to claim 1, further comprising a display processing unit configured to display a layout frame arranged on the back surface on a layout frame arranged on the front surface by superimposing, on a layout frame arranged on the front surface, the layout frame arranged on the back surface.

11. The layout apparatus according to claim 1, wherein the separation position indicates a cutting position.

12. A method for performing layout processing by arranging a plurality of layout frames in regions of each of two opposite surfaces of a sheet, the method comprising:

setting separation information for separating the plurality of layout frames on each of the surfaces;

setting, based on the set separation information, a separation position on at least one of the regions of each of the surfaces of the sheet such that the region corresponding to the set separation position is separated at the set separation position into areas on each of which the layout frames to be separated do not coexist; and correcting at least one of the separation position, a size of each layout frame, and a position of each layout frame so that the layout frames do not overlap with one another at the separation position on the surfaces of the sheet, and that the layout frames to be separated do not coexist in each of the areas into which the region is separated at the separation position, on the front and the back surfaces;

adding one or more new separation positions when a number of separation positions on the front surface differs from a number of separation positions on the back surface, so that the number of separation positions on the front surface is equal to the number of separation positions on the back surface.

13. The method according to claim 12, further comprising setting a separation position on each of the regions respectively corresponding to the front surface and the back surface of the sheet.

14. The method according to claim 13, further comprising adjusting the separation position on the back surface of the sheet to the separation position on the front surface of the sheet.

15. The method according to claim 13, further comprising adjusting the separation position on the front surface of the sheet to the separation position on the back surface of the sheet.

16. The method according to claim 13, further comprising correcting the separation position to an intermediate position between the separation position on the front surface of the sheet and the separation position on the back surface.

17. The method according to claim 13, further comprising setting, when the number of the separation positions on the front surface of the sheet differs from the number of the separation positions on the back surface of the sheet, one or more new separation positions so that the number of the separation positions on the front surface is equal to the number of the separation positions on the back surface.

18. The method according to claim 17, further comprising copying and arranging a layout frame arranged in a region to and in another region in which a layout frame generated by setting the new separation position is not arranged.

19. The method according to claim 18, wherein copying information for copying the layout frame as separation information can be set, the method further comprising copying and arranging a layout frame in which the copying information is set.

20. The method according to claim 12, further comprising arranging, when a layout frame overflowed by flowing contents thereinto is present, a new layout frame in a region on an opposite-side surface opposite to the surface, on which the layout frame to be overflowed is arranged, such that the region on the opposite-side surface includes a layout frame which is not to be separated from the layout frame to be overflowed, according to the separation information, and flowing, into the new layout frame, a part of contents to be flowed into the layout frame to be caused to overflow.

21. The method according to claim 12, further comprising displaying a layout frame arranged on the back surface on a layout frame arranged on the front surface by superimposing, on a layout frame arranged on the front surface, the layout frame arranged on the back surface.

22. The method according to claim 12, wherein the separation position indicates a cutting position.

23. A non-transitory computer-readable storage medium storing a program for causing a computer to execute the method according to claim 12.

* * * * *